United States Patent
Sato et al.

(10) Patent No.: US 6,208,812 B1
(45) Date of Patent: *Mar. 27, 2001

(54) CAMERA WITH BAR CODE READER

(75) Inventors: Tokuji Sato; Hisashi Hamada; Shiro Hashimoto; Shigenori Goto; Tatsuo Saito; Hiroyuki Arai; Akio Omiya; Makoto Akiba, all of Saitama (JP)

(73) Assignees: Fuji Photo Film Co., Ltd., Kanagawa; Fuji Photo Optical Co., Ltd., Saitama, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,584

(22) Filed: May 21, 1998

(30) Foreign Application Priority Data

| May 21, 1997 | (JP) | ................................................ | 9-131025 |
| Aug. 11, 1997 | (JP) | ................................................ | 9-216585 |
| Sep. 26, 1997 | (JP) | ................................................ | 9-261273 |
| Sep. 26, 1997 | (JP) | ................................................ | 9-262467 |

(51) Int. Cl.[7] ................................ G03B 7/00; G03B 19/02
(52) U.S. Cl. ........................ 396/210; 396/311; 396/390
(58) Field of Search ........................... 396/207, 210, 396/310, 311, 315, 319, 389, 390

(56) References Cited

U.S. PATENT DOCUMENTS

| Re. 34,452 | * | 11/1993 | Taniguchi | ........................... | 396/210 |
| 4,800,406 | * | 1/1989 | Signoretto | ........................... | 396/310 |
| 5,089,691 | * | 2/1992 | Morisaki et al. | ........................... | 396/210 |
| 5,109,241 | * | 4/1992 | Keeney | ........................... | 396/207 |
| 5,130,728 | * | 7/1992 | Goto et al. | ........................... | 396/319 |
| 5,587,752 | * | 12/1996 | Petruchik | ........................... | 396/315 |
| 5,596,384 | * | 1/1997 | Tanaka et al. | ........................... | 396/413 |
| 5,612,757 | * | 3/1997 | Amano | ........................... | 396/319 |
| 5,692,224 | * | 11/1997 | Saegusa | ........................... | 396/207 |
| 5,845,869 | | 12/1998 | Makino | ........................... | 242/584.1 |
| 5,893,000 | * | 4/1999 | Iwai et al. | ........................... | 396/514 |

FOREIGN PATENT DOCUMENTS

| 48-33284 | 10/1973 | (JP) . |
| 6-289457 | 10/1994 | (JP) . |

* cited by examiner

*Primary Examiner*—David M. Gray
(74) *Attorney, Agent, or Firm*—Young & Thompson

(57) ABSTRACT

A camera has a bar code reader for reading a bar code from a roll film loaded therein. Bar code data read from the bar code is checked out whether it has a proper format or not. If the bar code data read from the bar code of the loaded roll film is proper, the bar code data is written in a nonvolatile memory, and the camera is set up in accordance with the bar code data. The bar code data of the nonvolatile memory is renewed each time proper bar code data is obtained. If the bar code data read from the bar code of the loaded roll film is improper, a display device displays film data represented by bar code data having been stored in the nonvolatile memory, along with an error indicia. If the displayed film data is invalid for the loaded roll film, the photographer enters film data of the loaded roll film through manual operation switches. Then, the camera is set up with the manually entered film data. If no film data is manually entered, the camera is set up in accordance with the displayed film data.

11 Claims, 20 Drawing Sheets

CAMERA WITH BAR CODE READER

BACKGROUND OF THE INVENTION

1. Field of the Invention

The present invention relates to a camera provided with a bar code reader for reading a bar code from a roll film. The present invetion also relates to a method of automatically setting up the camera by use of the bar code. Particularly, the present invention relates to a camera having an automatic pressure plate setting mechanism for setting a pressure plate of the camera to a position determined according to the type of the loaded roll film that is read from the bar code of the loaded roll film.

2. Background Arts

ISO 120-type and 220-type rolled films are called Brownie film rolls in the art. In the 120-type, a 6 cm wide photo filmstrip is secured by an adhesive tape to a light-shielding backing paper which is longer than the filmstrip and backs the entire length of the filmstrip. The filmstrip is coiled with the backing paper around a spool. In the 220-type, short pieces of light-shielding paper, called leader and trailer papers, are spliced by adhesive tapes to opposite ends of a 6 cm wide photo filmstrip.

By replacing the long backing paper with the short leader and trailer papers in the 220-type, the 220-type roll film has got a longer filmstrip than the 120-type. In the camera, the portion of the 120-type roll film that extends in a film passageway behind the exposure frame is thicker by the thickness of the backing paper than that of the 220-type. To make sure to position the emulsion surface of the filmstrip in the proper focal plane whether it is the 120-type or the 220-type, the Brownie camera has conventionally been provided with a mechanism for adjusting the depth of the film passageway according to the thickness of the film portion. That is, the depth of the film passageway is enlarged for the 120-type, and is reduced for the 220-type.

There are various known mechanisms for changing over the depth of the film passageway. In a camera known as New Mamiya 6 (a trade name, Mamiya O.P. Co., Ltd.), the pressure plate inside a back lid of the camera is rotated by 90 degrees while the back lid is open. This rotation causes the pressure plate to move backward or forward of the camera. When the pressure plate is set in the forward position for the 220-type, the pressure plate comes in contact with rails. When the pressure plate is set in the backward position for the 120-type, the pressure plate is set slightly away from the rails. In a camera known as Fuji GSW680III Professional (a trade name, Fuji Photo Film Co., Ltd.), the pressure plate is removable from a back lid while the back lid is open. The pressure plate is turned over back to front or vise versa, and attached again to the back lid, thereby changing over the depth of the film passageway. In a camera known as Fuji GA645 Professional (a trade name, Fuji Photo Film Co., Ltd.), the pressure plate is manually pushed toward the back lid and slid in the film transport direction to change over the depth of the film passageway while the back lid is open.

In the known Brownie cameras, the back lid must be opened in order to change over the position of the pressure plate to adjust the film passageway to the roll film type. Once the film roll is loaded and the back lid is closed, even if the pressure plate is set wrong, it is impossible to correct the position of the pressure plate without fogging the filmstrip. If the pressure plate is set wrong, the photographed images would be out of focus, or the filmstrip would be scratched.

Japanese Utility Model Publication No. 48-33284 discloses a Brownie camera wherein a pressure plate is movable in an optical axis direction of a taking lens of the camera by sliding a knob that is provided on an outer portion of the back lid. Also in this case, the knob is manually operated. Therefore, the problem of setting the pressure plate wrong is not cleared away.

An idea of providing a bar code on the adhesive tape connecting the filmstrip to the light-shielding paper is disclosed in U.S. patent application Ser. No. 08/712,387, that was filed based on Japanese Patent Applications No. 7-235127 et al. The bar code on the adhesive tape represents information about the roll film, such as the discrimination between the 120-type and the 220-type, the film speed. By providing the Brownie camera with a bar code reader for reading the bar code, the camera can automatically adjust to the loaded roll film.

However, the camera should be able to operate with a roll film with no bar code as well as the roll film with a bar code. Moreover, the bar code on the roll film can be difficult to read depending upon its printing condition and the condition of the adhesive tape.

SUMMARY OF THE INVENTION

In view of the foregoing, an object of the present invention is to provide a camera which can operate with no problem even when it does not get proper bar code data from the loaded roll film.

Another object of the present invention is to provide a camera which can automatically adjust its film passageway to the loaded roll film.

To achieve the above object, a camera of the present invention for use with a roll film having a bar code thereon comprises a bar code reading device for reading the bar code of the roll film as presently loaded in the camera while a first frame recording area of a filmstrip of the presently loaded roll film is transported to an exposure position behind an exposure aperture; a checking device for checking if bar code data read by the bar code reading device is proper; a nonvolatile memory for storing bar code data, the bar code data of the nonvolatile memory being renewed each time proper bar code data is obtained through the bar code reading device; and a setup device for setting up the camera in accordance with the bar code data read from the bar code of the presently loaded roll film when the read bar code data is proper, or in accordance with bar code data stored in the nonvolatile memory when the read bar code data is improper.

According to the present invention, a camera which can automatically adjust its film passageway to the loaded roll film comprises a pair of film rails extending along the film passageway above and below an exposure aperture; a pressure plate for pressing the film slip from its back side toward the film rails, for the film slip to slide on the film rails; a bar code reading device for reading the bar code of the roll film; a determining device for determining the type of the roll film based on the read bar code; and a changing device for changing a tunnel gap of the film passageway between the pressure plate and the film rails in accordance with the determined roll film type.

The changing device comprises pushing cams for shifting the pressure plate in an optical axis direction of a taking lens of the camera by an amount determined by rotational positions of the pushing cams, and a control device for controlling rotational positions of the pushing cams in accordance with the thickness of the film slip.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
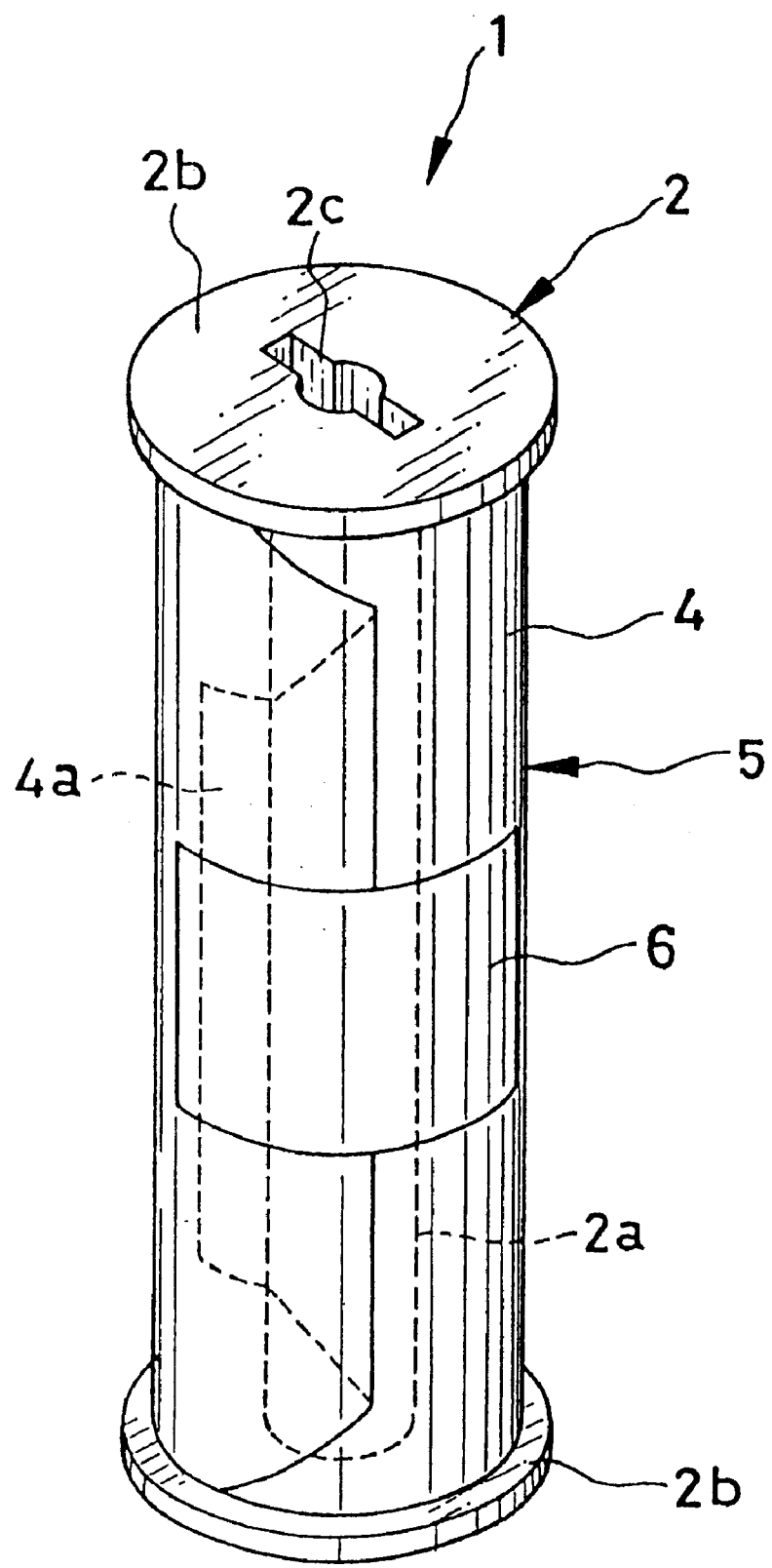
FIG. 1 is a perspective view of a photographic roll film consisting of a spool and a film slip wound on the spool.
Figure 2:
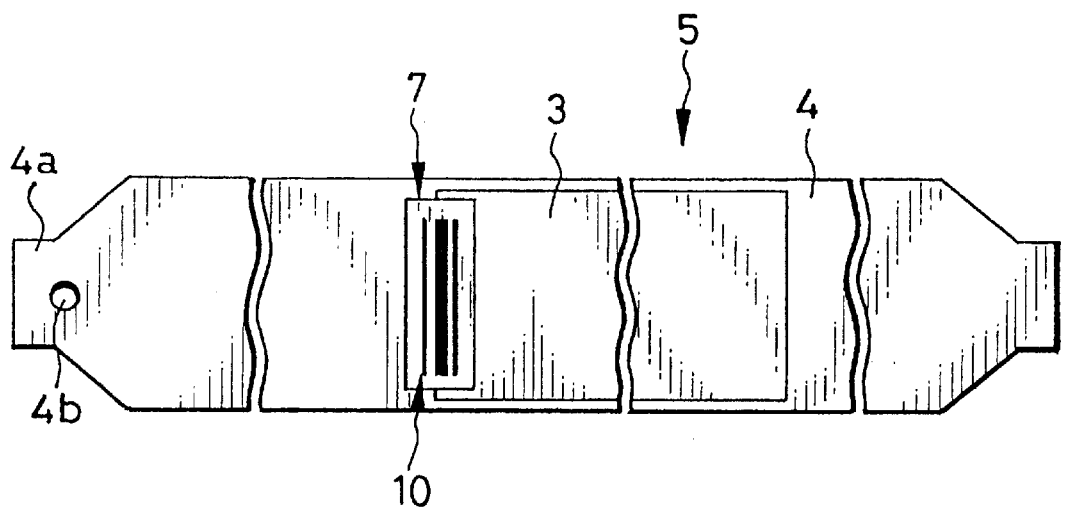
FIG. 2 is a schematic diagram illustrating a film slip of a 120-type roll film.

As shown in FIG. 1, an outer appearance of a photographic roll film 1 for use in a camera of the invention is similar to a conventional one regardless of whether it is of 120-type or 220-type. In the 120-type, a film slip 5 wound on a spool 2 consists of a photo filmstrip 3 and a light-shielding paper 4 backing the entire length of the filmstrip 3, as shown in FIG. 2. A leading end 4a of the light-shielding paper 4 at the outermost convolution of the roll film 1 is folded in and is secured by an adhesive tape 6. The spool 2 consists of a spool core 2a and a pair of flanges 2b. A pivot hole 2c for a rotary shaft of a camera is formed in a center of either flange 2b.

The light-shielding paper 4 has a hole 4b at its leading end 4a, so as to be hooked on a take-up spool in the camera. The filmstrip 3 is overlaid on a black inside surface of the light-shielding paper 4, and is secured at its leading end to the light-shielding paper 4 by an adhesive tape 7. The 120-type is classified into a standard type and a half type according to the length of the filmstrip 3. On the standard 120-type, 15 or 16 semi-brownie size frames (41.5 mm×56 mm) are available. On the half 120-type, 7 or 8 semi-brownie size frames are available.

Figure 3:
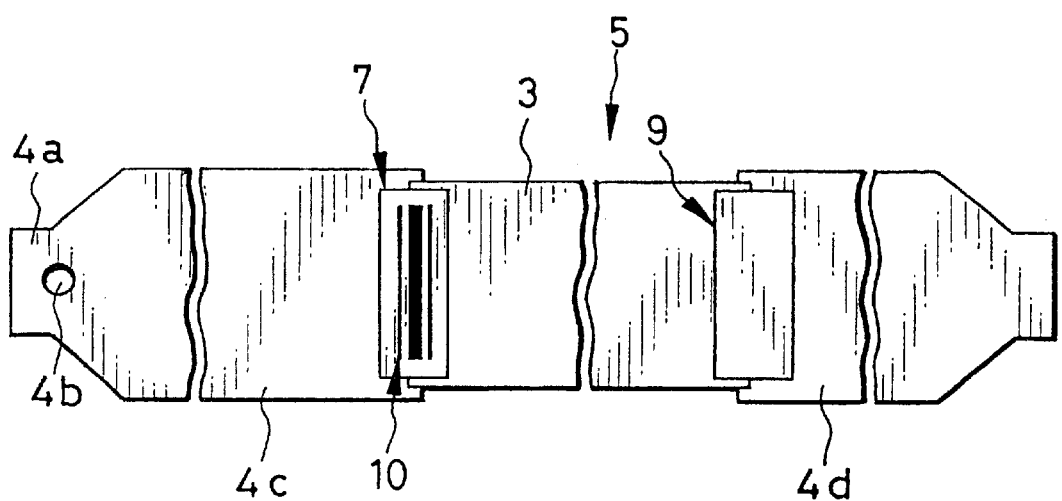
FIG. 3 is a schematic diagram illustrating a film slip of a 220-type roll film.

FIG. 3 shows a film slip 5 of the 220-type, which consists of a photo filmstrip 3 and two pieces of light-shielding paper 4c and 4d which are spliced to opposite ends of the filmstrip 3. Hereinafter, the light-shielding paper 4c or 4d will be referred to as the leader paper 4c or the trailer paper 4d respectively when it is necessary to distinguish from each other. Adhesive tapes 7 and 9 are used for securing the leader and trailer papers 4c and 4d to the filmstrip 3 respectively. A leading end 4a of the leader paper 4c has the same shape as the leading end 4a of the light-shielding paper 4 of the 120-type, and is also formed with a hole 4b for engagement with the take-up spool. The filmstrip 3 of the 220-type is about twice as long as that of the standard 120-type, so that it is possible to expose 30 or 32 semi-brownie size frames.

As shown in FIGS. 2 and 3, a bar code 10 is recorded on the adhesive tape 7 at the leading end of the filmstrip 3 in either type of roll film. The bar code 10 is formed by printing black parallel bars on a white obverse surface of the adhesive tape 7, each bar extending rectangularly to a lengthwise direction of the filmstrip 3. The bar code 10 represents information about the roll film 1: the film speed, the roll film type, such as the standard 120-type, the half 120-type, or the 220-type, and the type of the filmstrip 3, such as whiteand-black film or color film, negative film or positive film.

Figure 5:
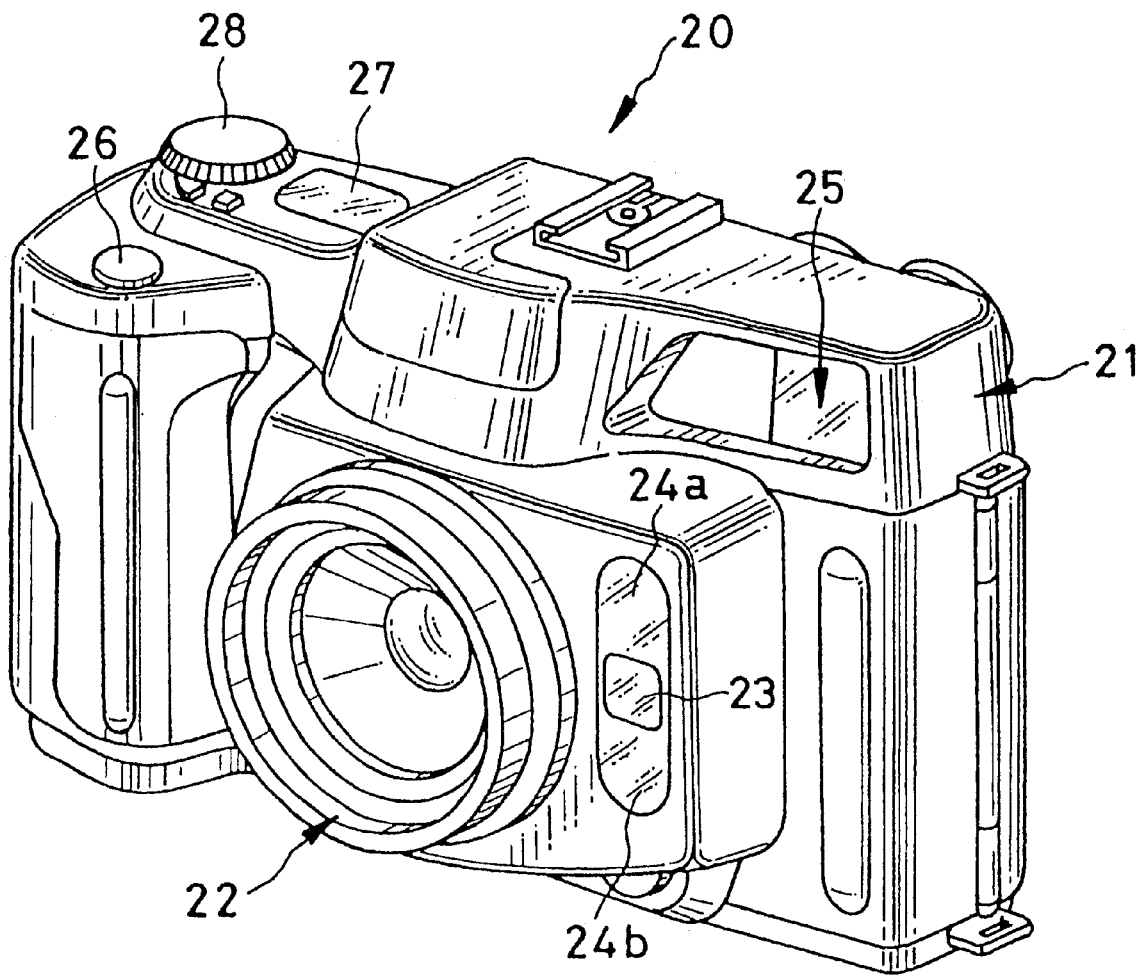
FIG. 5 is a front perspective view illustrating a camera according to an embodiment of the present invention.

FIG. 5 shows a camera 20 that can photograph a frame in the semi-brownie size, so that it is possible to photograph 15 frames on the roll film 1 if it is the standard 120-type, or 7 frames on the half 120-type, or 30 frames on the 220-type.

On the front side of a camera body 21, there are a taking lens 22, a photometric window 23 for automatic exposure control, a pair of range finding windows 24a and 24b for automatic focusing, and a viewfinder 25. On the top of the camera body 21, there are a release button 26, a liquid crystal display (LCD) panel 27 for displaying information for the photography, and an operation dial 28 for various manual operations.

The taking lens 22 is focused on a subject range detected through the range finding windows 24a and 24b. The release button 26 has a half-depressed position and a full-depressed position. In the half-depressed position of the release button 26, the photometry for the automatic exposure control and the range finding are effected. When the release button 26 is fully depressed, a shutter is released to make an exposure. The release button 26 doubles as a start button for starting a first frame setting program. The first frame setting is setting a first frame exposure area of the filmstrip in an exposure position behind an exposure aperture 34, as set forth in detail later.

Figure 6:
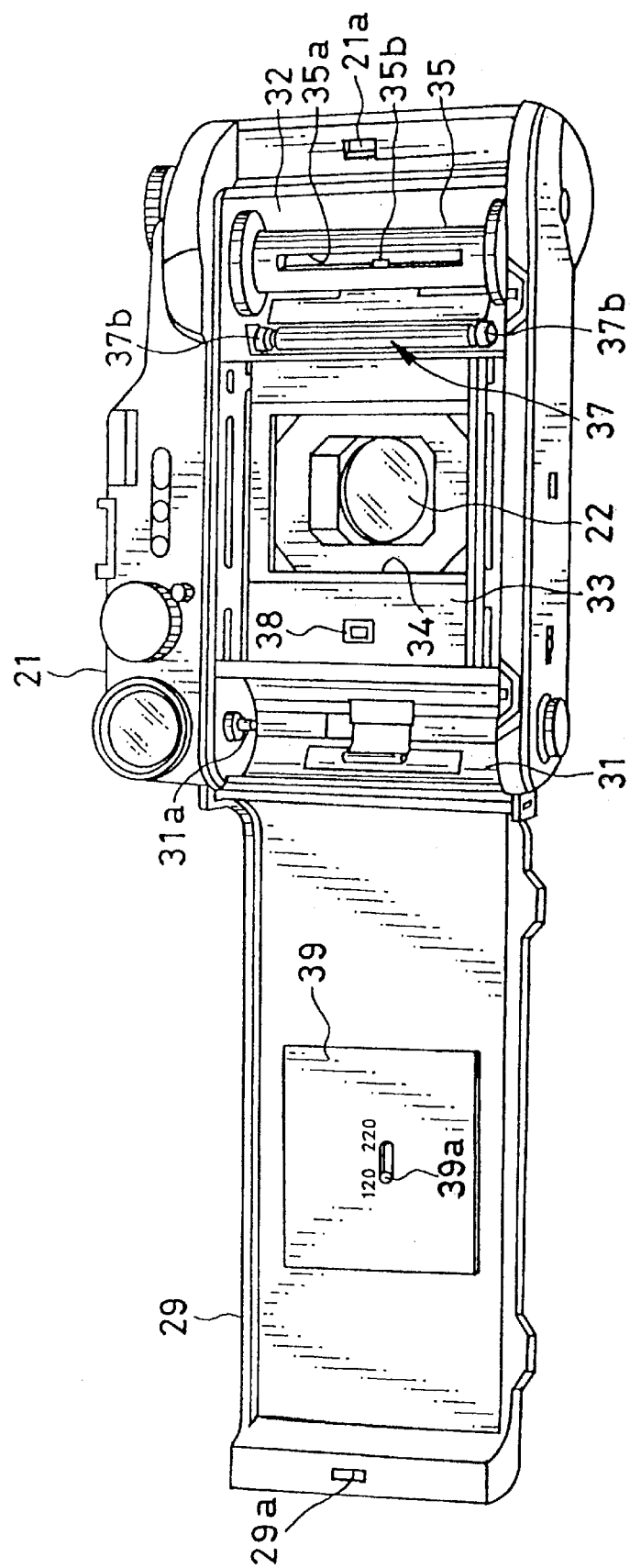
FIG. 6 is a rear perspective view illustrating the camera shown in FIG. 5, with its back lid opened.

FIG. 6 shows the rear side of the camera body 21 with its back lid 29 opening. Inside the camera body 21, there are a film supply chamber 31, a film take-up chamber 32 and a film passageway 33 in between these chambers 31 and 32. The exposure aperture 34 defining the frame size on the filmstrip 3 is formed in a position of the film passageway 33 behind the taking lens 22.

The roll film 1 before exposure is set in the film supply chamber 31, with the pivot hole 2c of the spool 2 fit on a rewinding shaft 31a that protrudes inward from the top wall of the film supply chamber 31. Thus, the roll film 1 is rotatable together with the rewinding shaft 31a inside the film supply chamber 31. The film take-up chamber 32 is provided with a take-up spool 35. The take-up spool 35 has the same construction as the spool 2, so a spool 2 of a used-up roll film 1 may be reused as the take-up spool 35.

Figure 7:
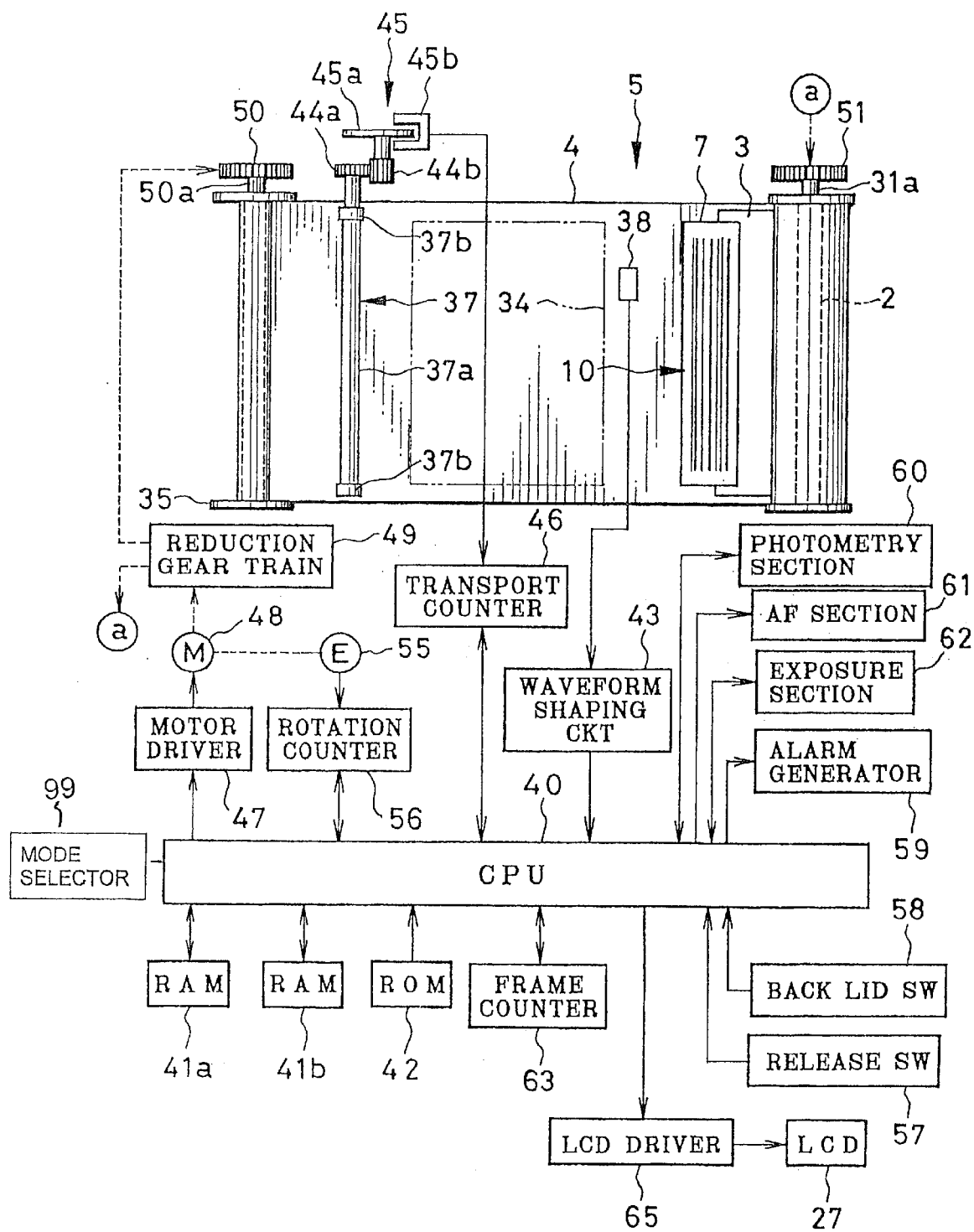
FIG. 7 is a schematic diagram illustrating an electric construction of the camera shown in FIG. 5.

To load the roll film 1, the leading end 4a of the light-shielding paper 4 or 4c is inserted into a slit 35a of the take-up spool 35. A hook 35b is formed inside the slit 35a, so the hole 4b of the leading end 4a is caught on the hook 35b. This makes it unnecessary to secure the film slip 5 to the take-up spool 35 by winding the light-shielding paper 4 or 4c a couple of times around the take-up spool 35 prior to the first frame setting. As shown in FIG. 7, the take-up spool 35 is rotated through a drive shaft 50a of the camera that is engaged in the pivot hole of the flange of the take-up spool 35.

A driven roller member 37 is disposed in the film supply chamber 31 near the film passageway 33. The driven roller member 37 is constituted of frictional rollers 37b, e.g. rubber rollers, secured to opposite ends of an axle 37a. The film slip 5 is in contact with the rollers 37b, so the driven roller member 37 is rotated along with the movement of the film slip 5. Thus, the rotational amount of the driven roller member 37 represents the transport length of the film slip 5.

A reflective photo sensor 38 is mounted in a wall surface of the film passageway 33 in between the exposure aperture 34 and the film supply chamber 31. The photo sensor 38 is positioned to face the bar code 10 on the adhesive tape 7 when the film slip 5 is transported through the film passageway 33. The photo sensor 38 projects infrared light toward the film slip 5 and receives light reflected from the film slip 5. Based on the signal level of photoelectric signal output from the photo sensor 38, that corresponds to the intensity of received light, the filmstrip 3 and the bar code 10 are detected.

The back lid 29 covers the film supply chamber 31, the film take-up chamber 32 and the film passageway 33 to shield the interior of the camera body 21 in a light-tight fashion. The back lid 29 is locked in the closed position through a locking claw 29a that engages in a locking hole 21a of the camera body 21.

A pressure plate 39 is mounted on an inside surface of the back lid 29, for pressing the filmstrip 3 from the back when it is positioned behind the exposure aperture 3. The position of the pressure plate 39 is adjustable in the optical axis direction of the taking lens 22 by setting a selection member 39a to a 120-type position or a 220-type position. Concretely, for the 120-type, the pressure plate 39 is set back by the thickness of the light-shielding paper 4 from the position for the 220-type. Thereby, the emulsion surface of the filmstrip 3 is positioned in the focal plane of the taking lens 22 whether or not the light-shielding paper 4 exists behind the filmstrip 3.

The camera 20 has a CPU 40 that controls electric components of the camera 20 according to a program written in a ROM 42, and also decodes the bar code 10 to detect the film speed, the roll film type and other film data. The CPU 40 is connected also to RAMS 41a and 41b.

The RAM 41a is a non-volatile memory that is kept being power-supplied to preserve stored data even while the main power source of the camera 20 is turned off or while the back lid 29 is open. The RAM 41a stores bar code data read from the bar code 10. The bar code data stored in the RAM 41a is renewed when a new set of bar code data is read from a newly loaded roll film 1 and the new set of bar code data is determined to be proper. If some film data is manually entered when the CPU 40 does not get any bar code data or determines the read bar code data improper, the RAM 41a is cleared off, and the manual film data is written in the RAM 41a.

The RAM 41b functions as a work memory for temporarily storing bar code data read from the bar code 10, various photographic data and control data. The RAM 41b is cleared off each time the power source of the camera 20 is turned off or the back lid 29 is opened. The RAM 41b also has a memory location for storing a rereading flag that is set up when the CPU 40 fails to read the bar code 10.

The photoelectric signal from the photo sensor 38 is sent to a waveform shaping circuit 43, which shapes the photoelectric signal by use of appropriate threshold levels to output a reflection signal with three levels: low, middle and high levels. The reflection signal has the low level when the photo sensor 38 scans the black inside surface of the light-shielding paper 4 or the black bars. The reflection signal has the high level when the photo sensor 38 scans the white obverse surface of the adhesive tape 7 that serves as start and end quiet zones and white bars. The reflection signal has the middle level when the photo sensor 38 scans the filmstrip 3. The reflection signal is sent to the CPU 40, which is used for the detection of the filmstrip 3, as well as for the decoding of the bar code 10.

A transport length encoder 45 is coupled to the axle 37a of the driven roller member 37 through gears 44a and 44b. The transport length encoder 45 has an encoder disc 45a that rotates with the axles 37a and is provided with a plurality of radial slits arranged at regular intervals around a rotary center of the encoder disc 45a. A photo interrupter or transparent type photo sensor 45b is provided in combination with the encoder disc 45a, for detecting the slits of the encoder disc 45a. The photo interrupter 45b is connected to a not-shown pulse generator which generates an encoder pulse upon each detection of the slit by the photo interrupter 45b. Instead of providing the slits in the encoder disc 45a, it is possible to provide high reflective sectors and low reflective sectors alternately around the rotary center of the encoder disc 45a, and detect encode pulses through a reflective photo sensor.

According to this configuration, the transport length encoder 45 generates one encode pulse per a given rotational amount of the driven roller member 37, that is, a given transport length of the film slip 5. Thus, the encode pulses from the transport length encoder 45 will be referred to as transport pulses. In this embodiment, each time the filmstrip 3 is transported by one frame, the encoder 45 generates about 40 transport pulses and sends them to a transport counter 46. The transport counter 46 counts up one by one upon each transport pulse. The count of the transport counter 46 is sent to the CPU 40. The count of the transport counter 46 is also used for checking if a trailing end of the film slip 5 moves to the take-up spool 35.

A motor driver 47 drives a transport motor 48 under the control of the CPU 40. The rotation of the transport motor 48 is transmitted through a reduction gear train 49 to a gear 50. The drive shaft 50a is formed on the bottom of the gear 50, so that the take-up spool 35 is rotated by the transport motor 48. In the first frame setting, the CPU 40 drives the transport motor 48 to rotate continuously till the first frame on the filmstrip 3 is placed in the exposure position behind the exposure aperture 34. Thereafter, the transport motor 48 is rotated to wind up the filmstrip 3 one frame after another. After exposure of all available frames, the CPU 40 continues to rotate the transport motor 48 forward again till the entire length of the film slip 5 is wound up on the take-up spool 35. When an error occurs in reading the bar code 10, the CPU 40 rotates the transport motor 48 rearward until the adhesive tape 7 goes past the photo sensor 38.

The reduction gear train 49 changes the direction to transmit the rotational movement depending upon the rotational direction of the transport motor 48. That is, while the transport motor 48 rotates forward, the rotational movement is transmitted to the gear 50. While the transport motor 48 rotates rearward, the rotational movement is transmitted to a gear 51 that is formed coaxially with the rewinding shaft 31a, thereby to rotate the rewinding shaft 31a and thus the spool 2 in a direction to rewind the film slip 5 back onto the spool 2.

A motor encoder 55 is connected to the transport motor 48. The motor encoder 55 has the same construction as the transport encoder 45, and outputs one encode pulse per given rotational angle of the transport motor 48. Hereinafter, encode pulses generated from the motor encoder 55 will be referred to as rotation pulses. In order to measure the width of each bar element of the bar code 10, the motor encoder 55 generates about seven pulses per 1 mm transport of the filmstrip 3 in a time period while the adhesive tape 7 passes by the photo sensor 38. The rotation pulses are sent to a rotation counter 56.

The rotation counter 56 counts up one by one upon each rotation pulse, and sends its count to the CPU 40. Based on the count of the rotation counter 56, the CPU 40 discriminates between wide bar and the narrow bar, to decode the bar code 10. The count from the rotation counter 56 is used also for controlling stopping the transport motor 46.

As the diameter of the roll of film slip 5 around the take-up spool 35 increases, the amount of film slip 5 wound up by one rotation of the take-up spool 35 increases. Therefore, the number of rotation pulses is not exactly proportional to the transport length of the film slip 5. However, because the variation in the diameter of the film roll on the take-up spool 35 is slight during the first frame setting, the count of the rotation counter substantially corresponds to the movement of the adhesive tape 7 in the film transport direction. Thus, it is possible to measure the width of each bar element from the number of the rotation pulses.

A release switch 57 is actuated in cooperation with the release button 26. When the release button 26 is half depressed, the release switch 57 outputs a half-depression signal to the CPU 40. When the release button 26 is fully depressed, the release switch 57 outputs a full-depression signal to the CPU 40. The half-depression signal and the full-depression signal will be generically called the release signal.

A back lid switch 58 is disposed inside the locking hole 21a, such that the back lid switch 58 outputs a low level signal while the back lid 29 is open, or a high level signal while the back lid 29 is closed. The output signal from the back lid switch 58, hereinafter called the back lid signal, is sent to the CPU 40.

An alarm generator 59 is connected to the CPU 40, to alarm when there is the last one exposure available. A photometric section 60, which includes a photo sensor that is disposed behind the photometric window 23, measures a subject brightness and sends it to the CPU 40. The CPU 40 calculates an optimum aperture size and an optimum shutter speed based on the subject brightness and the film speed read from the bar code 10 and stored in the RAM 40a. An auto focus (AF) section 61 consists of a reflective photo sensor disposed behind the range finding windows 24a and 24b, and a lens driving device for focusing the taking lens 42 onto a subject distance determined by the range finding.

An exposure section 62 consists of a shutter mechanism and a stop mechanism, which are actuated upon the full depression signal from the release switch 57, to make an exposure in accordance with the aperture size and the shutter speed calculated by the CPU 40. The exposure section 62 outputs an exposure signal to the CPU 40 after each exposure.

A frame counter 63 is provided for counting the remaining number of available exposures. The frame counter 63 is initialized to the total number of available exposures that is determined by the type data read from the bar code 10. As the camera 20 takes each frame in semi-brownie size, the initial value of the frame counter 63 is "15" for the standard 120-type, "7" for the half 120-type, or "30" for the 220-type. Needless to say, the initial value varies depending upon the frame size of the individual camera as well as the roll film type. The frame counter 63 counts down one by one after each exposure under the control of the CPU 40. The count of the frame counter 63 is monitored by the CPU 40.

It is possible to count the remaining number of available exposures by use of the RAM 40a in place of the frame counter 63. The transport counter 46 and the rotation counter 56 may also be replaced by the RAM 40a.

An LCD driver 65 drives the LCD panel 27 to display various information. As shown for example in FIG. 8, the LCD panel 27 displays a roll film type indicia 66a, an available exposure number 66b, numbers 66c and 66d showing the shutter speed and the aperture size determined by the CPU 40, and a film speed indicia 66e.

When a bar code reading error occurs, the CPU 40 rewinds the roll film 1 and then forwards the film slip 5 to read the bar code 10 again. If the CPU 40 fails to read the bar code 10 normally for the second time, the CPU 40 drives the alarm generator 59 and the LCD 27 to notice the error to the photographer.

At the same time, the CPU 40 drives the LCD 27 to display film data of the roll film used last in the camera 20 that is represented by the bar code data stored in the RAM 41a. The photographer checks if the displayed film data is valid to use for the presently loaded roll film 10. If the displayed film data is valid, the photographer can operate the camera 20 as usual. Then, the CPU 40 sets up the camera 20 based on the bar code data stored in the RAM 41a.

If the displayed film data is invalid, the photographer operates various set up switches that are provided on a top side of the camera 20, to enter film data manually. Then, the CPU 40 clears off the RAM 41a, and writes the manual film data in the RAM 41a, while setting up the camera 20 based on the manual film data.

The CPU 40 electrically locks the release button 26 during the first frame setting and the bar code reading, such that the exposure section 62 is not activated even when the release button 26 is depressed to input the release signal.

Figure 4:
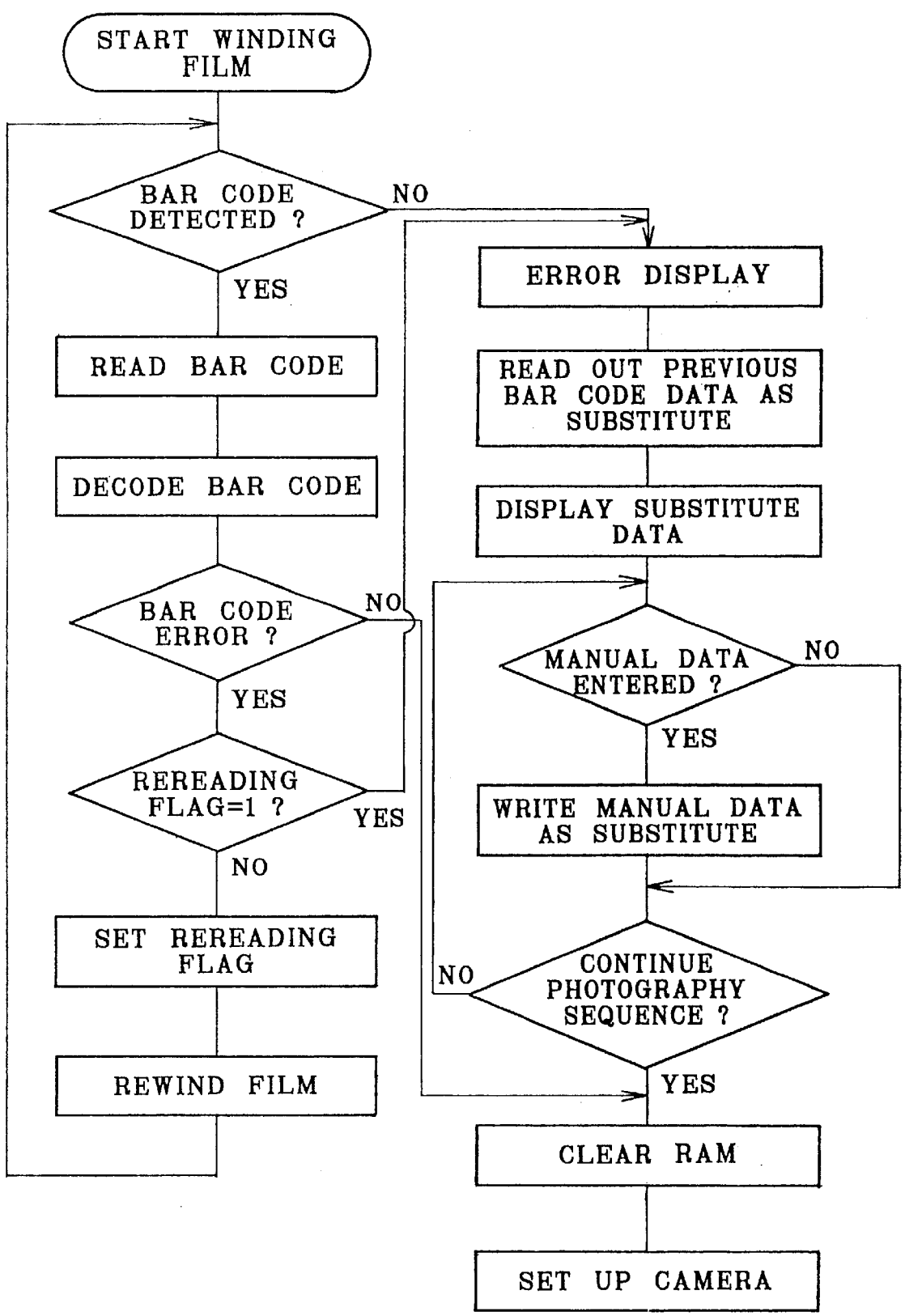
FIG. 4 is a flow chart illustrating a method of setting up a camera based on a bar code read from a roll film.

The operation of the camera 20 will now be described with reference to FIG. 4.

When loading the roll film 1, the photographer opens the back lid 29 and sets the selection member 39a to one of the two switching positions in accordance with the type of the roll film 1. Thereafter, the roll film 1 is positioned in the film supply chamber 31 with the pivot hole 2c of the spool 2 fit on the rotary shaft 31a. Then, the adhesive tape 6 is removed, and the leading end 4a of the light-shielding paper 4 is unfolded. The leading end 4a is inserted into the slit 35a of the take-up spool 35a, thereby the hole 4b is caught on the hook 35b. Thereafter when the back lid 29 is closed, the back lid signal is sent from the back lid switch 58 to the CPU 40.

When the release button 26 is depressed for the first time after the back lid signal, the CPU 40 performs the first frame setting. In the first frame setting, the CPU 40 first drives the transport motor 48 through the motor driver 47. As the transport motor 48 rotates, the take-up spool 35 is rotated in the winding direction through the gear 50 and the drive shaft 50a. Thereby, the light-shielding paper 4 of the roll film 1 is wound onto the take-up spool 35, while being transported from the film supply chamber 31 through the film passage-way 33.

The CPU 40 activates the photo sensor 38 simultaneously with the start of driving the transport motor 48. As long as the photo sensor 38 detects the black inside surface of the light-shielding paper 4, the reflection signal from the wave form shaping circuit 43 takes the low level. When the adhesive tape 7 comes to the detection range of the photo sensor 38, the reflection signal changes to the high level, because the photo sensor 38 first detects the start quiet zone at that time. When the CPU 40 detects the leading end of the adhesive tape 7 by the change of the reflection signal from the low to the high level, the CPU 40 starts reading and decoding the bar code 10. The CPU 40 resets the rotation counter 56 to zero to start counting the rotation pulses from zero, each time the reflection signal changes its level. The count of the rotation counter 56 is used for decoding the bar code 10. The data read from the bar code 10 is written in the RAM 41b.

When the adhesive tape 7 goes past the photo sensor 38, the photo sensor 38 begins to scan the filmstrip 3, so that the reflection signal changes from the high level to the middle level. Then, in order to position the first frame exposure area of the filmstrip 3 behind the exposure aperture 34, the CPU 40 resets the transport counter 46 to zero to start counting from zero upon receipt of the middle level reflection signal. Since the driven roller member 37 is rotated along with the movement of the film slip 5, the count of the transport counter 46 represents the advanced length of the film slip 5.

The CPU 40 stops the transport motor 48 to stop transporting the film slip 5 when the count of the transport counter 46 reaches a given value that is determined by the number of transport pulses necessary to transport the filmstrip from the detection of the leading end of the filmstrip 3 to the position where the first frame exposure area stops behind the exposure aperture 34.

After the transport motor 48 stops, the CPU 40 compares the bar code data read from the loaded roll film 1 and is written in the RAM 41b to table data about roll films stored in the ROM 42. When the bar code data written in the RAM 41b coincides with one unit of the table data, the CPU 40 determines that the bar code 10 is normally read from the roll film 1. Then, the CPU 40 clears the RAM 41a and writes the newly read bar code data in the RAM 41a.

Thereafter, the CPU 40 determines the number of available exposures with reference to the roll film type indicated by the bar code data, and sets the available exposure number as an initial value in the frame counter 63. Then, the CPU 40 drives the LCD 27 to display the count of the frame counter 63, the roll film type, and the film speed. When the first frame setting is accomplished in this way, the camera 20 is ready to take photographs.

If the bar code data read from the roll film 1 does not coincide with any of the table data stored in the ROM 42, the CPU 40 regards it as a bar code reading error, and then checks if the rereading flag is set in the RAM 41b. If not, the CPU 40 sets the rereading flag in the RAM 41b, and rotates the transport motor 48 rearward through the motor driver 47. Upon the rearward rotation of the transport motor 48, the reduction gear train 49 switches over the power transmitting direction to rotate the spool 2 in the rewinding direction through the gear 51. Simultaneously with the start of rearward rotation of the transport motor 48, the CPU 40 resets the transport counter 46 and the rotation counter 56. After being rotated for the rewinding, the transport motor 48 is stopped at a position several revolutions beyond the position where the photo sensor 38 detects the light-shielding paper 4.

Thereafter, the CPU 40 rotates the transport motor 48 forward again to rotate the take-up spool 35 in the winding direction, and starts the bar code reading sequence for the second time in the same way as above. The bar code data read from the bar code 10 is written in the RAM 41b, and is compared to the table data stored in the ROM 42. If the bar code data does not coincide with any of the table data again, the CPU 40 checks if the rereading flag is set in the RAM 41b. Since the rereading flag is set at the first reading error detection, the CPU 40 drives the alarm generator 59 and the LCD 27 to notice the bar code reading error to the photographer.

The CPU 40 also reads out the bar code data that has been stored in the RAM 41a, writes it in the RAM 41b, and drives the LCD 27 to display film data that is represented by the bar code data read from the RAM 41a. If the displayed film data is valid to use for the presently loaded roll film 10, the photographer operates the camera 20 as usual. Then, the CPU 40 clears the RAM 41a and writes the bar code data written in the RAM 41b back in the RAM 41a, and sets up the camera 20 based on the bar code data stored in the RAM 41a. In this way, if a bar code reading error occurs, the CPU 40 can use the bar code data stored in the RAM 41a for automatically setting up the camera 20 instead of the bar code data read from the loaded roll film 1, without any manual operation. Therefore, the photographer can take a picture immediately after loading the roll film 1. Thus, the trouble of loosing a shutter chance is reduced even while the bar code reading error occurs.

If the displayed film data is not useful for the presently loaded roll film, the photographer operates various set up switches of the camera 20 to enter film data manually. Then, the CPU 40 clears the RAM 41a, and writes the manual film data in the RAM 41a, while setting up the camera 20 based on the manual film data.

When the presently loaded roll film does not have a bar code on its adhesive tape, the CPU 40 notices the photographer of an error by the alarm generator 59 and the LCD 27. Then, the CPU 40 reads out the bar code data from the RAM 41a to display film data represented by the stored bar code data on the LCD 27. If the photographer confirms that the displayed film data is applicable to the presently loaded roll film, the photographer continues to operate the camera 20 for photography. Then, the CPU 40 sets up the camera 20 based on the previously stored bar code data. If not, the photographer manually enters film data. The CPU 40 sets up the camera 20 based on the manually entered film data.

It is possible to provide several modes using mode selector 99 illustrated schematically in FIG. 7 for setting up the camera 20 in case of a bar code reading error or for a roll film with no bar code, so the photographer can select one of these modes. In one mode, the photographer can either use the bar code data stored in the RAM 41a or enter film data manually. In another mode, the bar code data stored in the RAM 41a is always substituted for the erroneous bar code data. In a third mode, manually entered film data is always used as a substitute to the erroneous bar code data.

The RAM 41a for preserving the previously used bar code data may be replaced with an EEPROM or another type ROM that preserves data without the need for power supply. The bar code 10 may be provided on a leading portion of the light-shielding paper, instead of the adhesive tape, by attaching a bar code label to the leading portion or by printing the bar code directly on the leading portion of the light-shielding paper. The bar code may be provided on an end face of a flange of the spool of the roll film. In that case, a photo sensor should be located inside the film supply chamber 31 to face the bar code on the flange.

Figure 8:
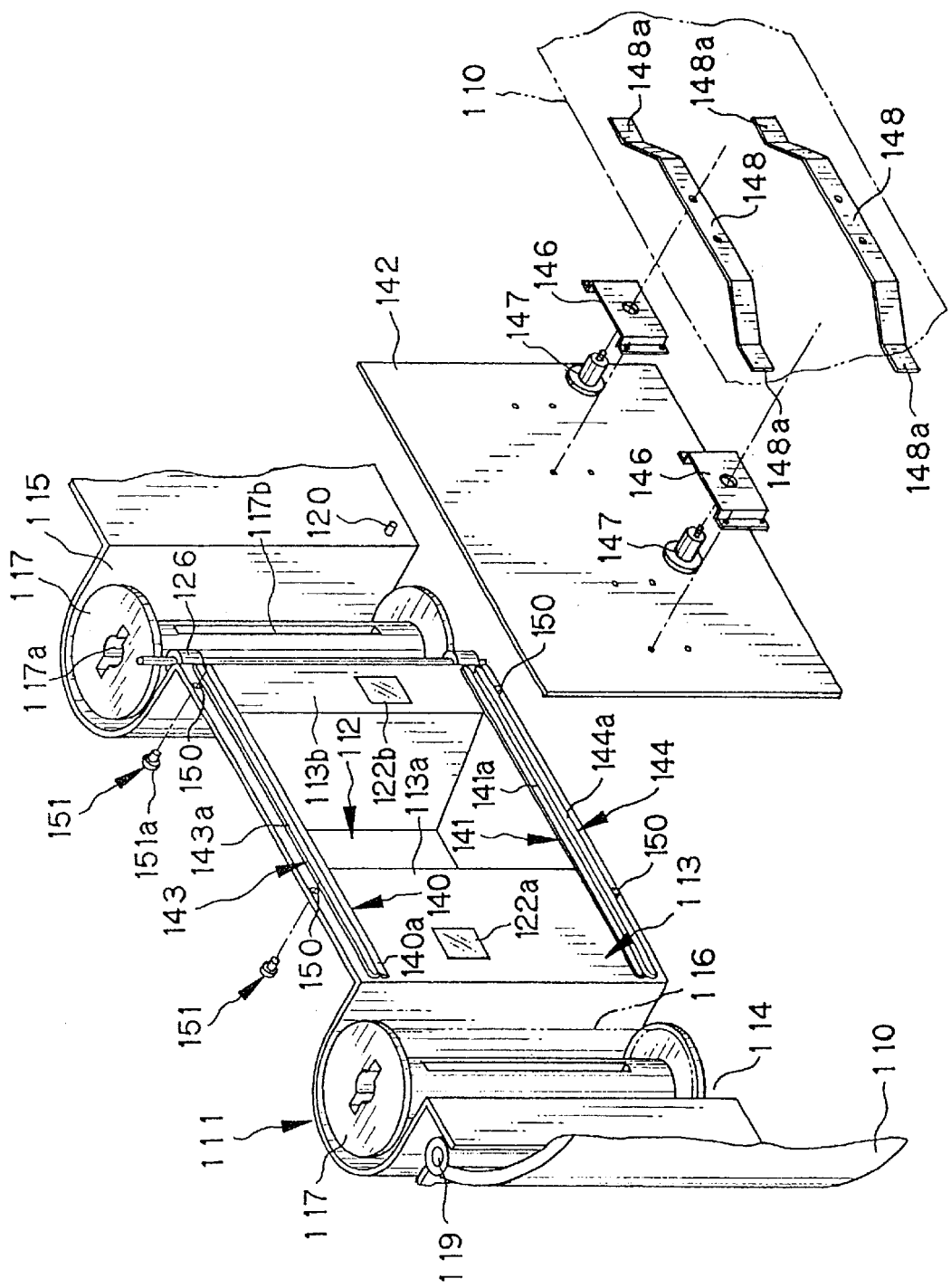
FIG. 8 is an exploded rear perspective view illustrating a camera according to another embodiment of the invention.
Figure 9:
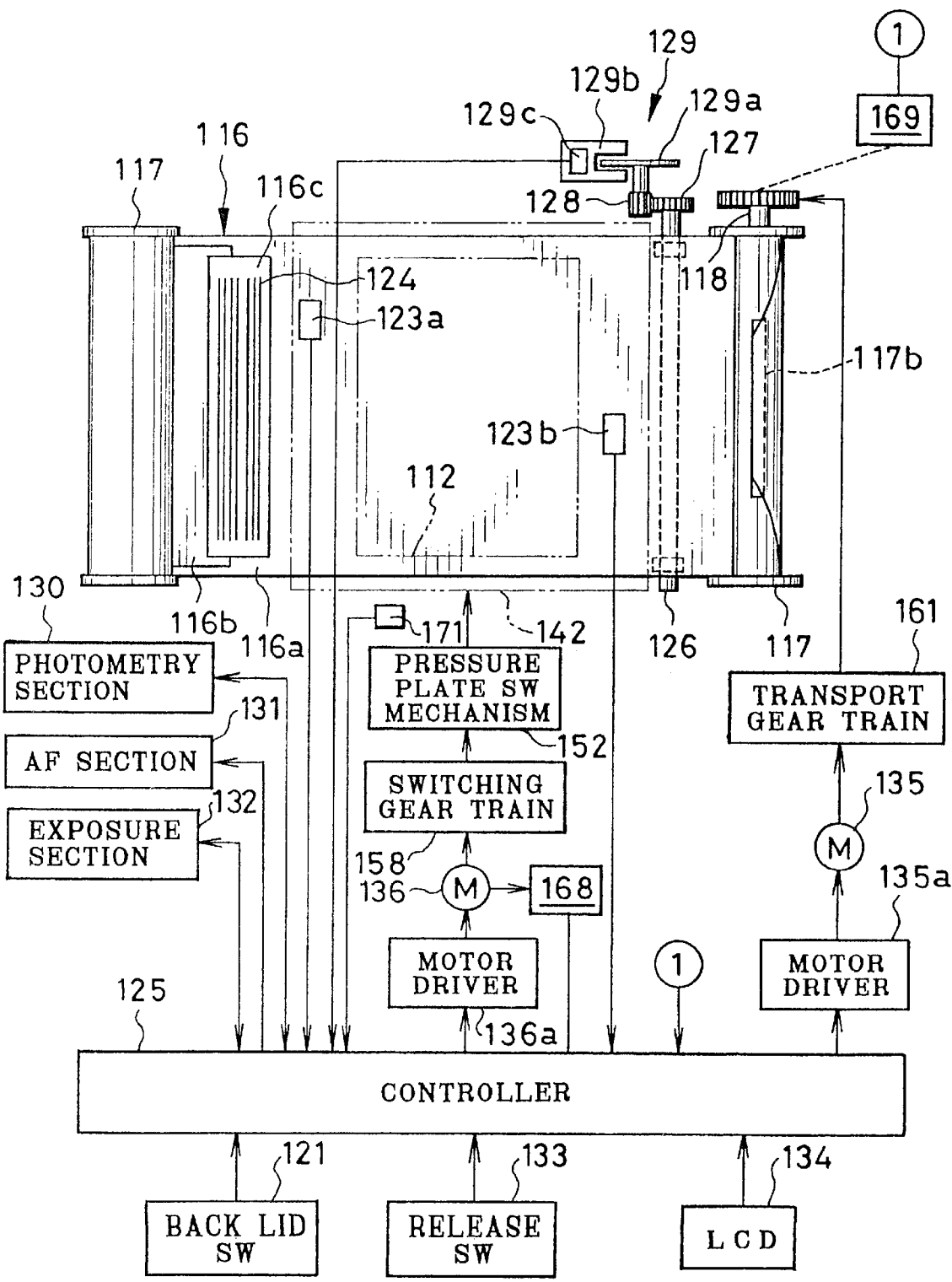
FIG. 9 is a schematic diagram illustrating an electric construction of the camera shown in FIG. 8.

FIG. 8 shows a camera with a bar code reader according to another embodiment of the invention. In FIG. 8, a back lid 110 is hinged to a camera body 111 having an exposure aperture 112, a film passageway 113, a film supply chamber 114 and a film take-up chamber 115. The film supply chamber 114 holds a roll of Brownie film slip 116, whereas the film take-up chamber 115 holds a spool 117. The spool 117 has an engaging hole 117a that is engaged with a spool drive shaft 118, as shown in FIG. 9, so the spool 117 is rotated by the spool drive shaft 118. The film slip 116 is wound on a spool 117 that is equal to the spool 117 mounted in the film take-up chamber 115. In the embodiment shown in FIG. 9, the film slip 116 is of 120-type, wherein a light-shielding paper 116a backs the entire length of a filmstrip 116b, extends beyond the filmstrip 116b, and is secured to the filmstrip 116b by an adhesive tape 116c.

After the film slip 116 is put in the film supply chamber 114, a leading end of the light-shielding paper 116a is inserted in a slot 117b of the spool 117 in the film take-up chamber 115. If the film slip 116 has an engaging hole in the leading end of the light-shielding paper 116a, and the slot 117b has an engaging hook, the engaging hole is caught on the engaging hook, securing the light-shielding paper 116a to the spool 117. If the film slip 116 does not has such an engaging hole, or the slot 117b does not has such an engaging hook, the 118 is rotated to wind the light-shielding paper 116a a couple of turns around the spool 117 after the leading end of the light-shielding paper 116a is inserted in the slot 117b. In this way, the light-shielding paper 116a is secured to the spool 117 in the film take-up chamber 115. Thereafter when the 110 is closed about a hinge 119, the 110 pushes a detection pin 120 to turn a back lid switch 121 on. Upon the back lid switch 121 being turned on, a first frame setting process is automatically started.

Transparent windows 122a and 122b are provided in camera body wall portions 113a and 113b constituting the film passageway 113. As shown in FIG. 9, a film sensor 123a for detecting the adhesive tape 116c and a bar code sensor 123b for reading a bar code 124 on the adhesive tape 116c are disposed behind the transparent windows 122a and 122b respectively. The sensors 123a and 123b are photo sensors that project infrared light toward the film slip 116, receive reflection light, and output electric sensor signals whose level varies according to the intensity of the received reflection light. The sensor signals are sent to a controller 125. Since the light-shielding paper 116a, the filmstrip 116b and the adhesive tape 116c have different reflectance from each other, the controller 125 detects the adhesive tape 116c based on the sensor signal from the film sensor 123a, and controls the first frame setting and a last film winding with reference to the position of the adhesive tape. The controller 125 discriminates between black bar and white bar of the bar code 124 based on the sensor signal from the bar code sensor 123b, and decodes the bar code 124.

Figure 10:
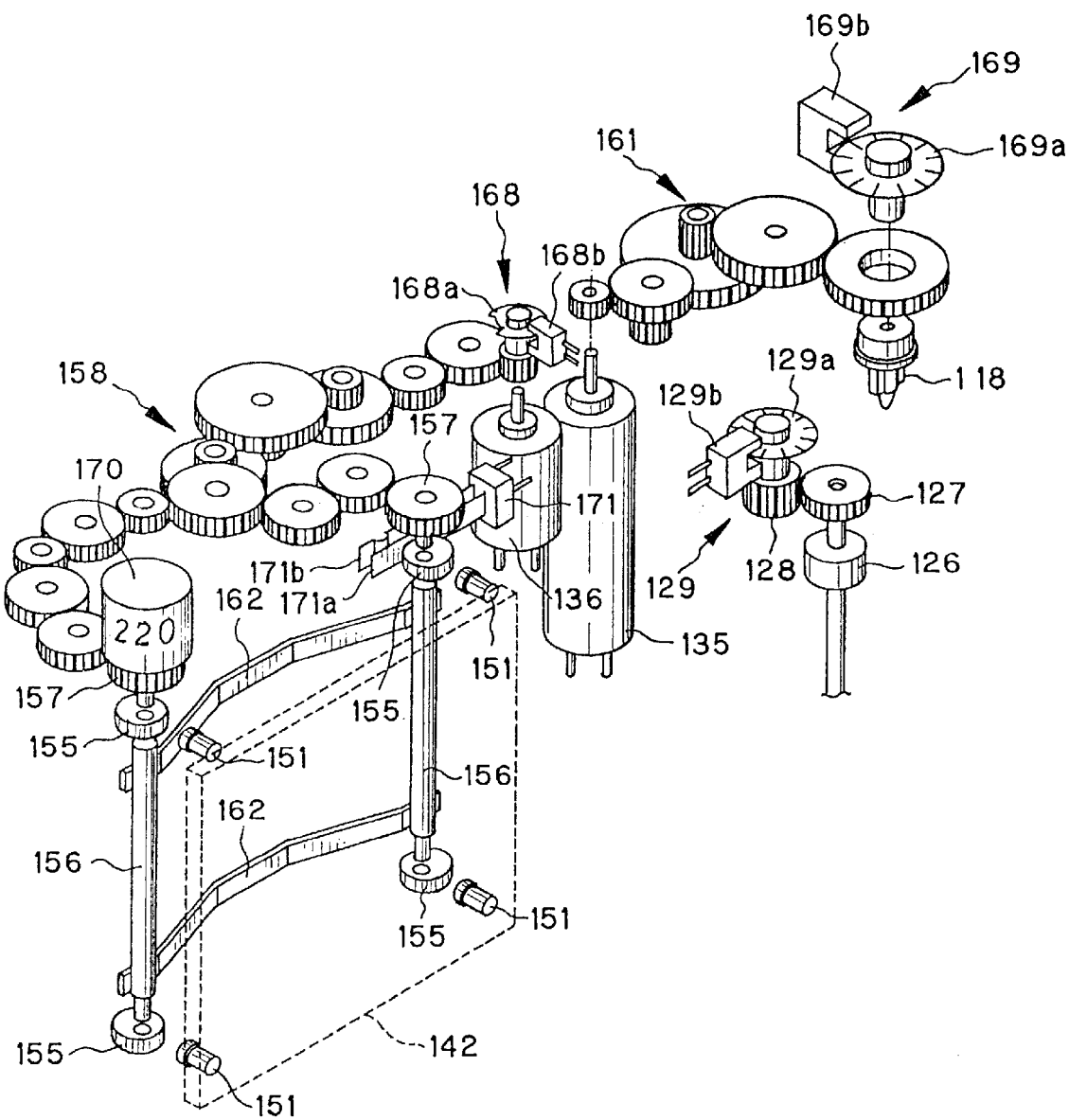
FIG. 10 is a schematic diagram illustrating a film transport mechanism and a pressure plate switching mechanism of the camera shown in FIG. 8.

A driven roller 126 is provided in the film take-up chamber 115 nearby the film passageway 113. While the film slip 116 is wound up onto the spool 117 by rotating the spool 117, the driven roller 126 is rotated by the movement of the film slip 116. As shown in FIG. 10, the driven roller 126 is coupled to a transport encoder 129 through gears 127 and 128. The transport encoder 129 consists of an encoder plate 129a, a photo interrupter 129b and a pulse generator 129c, as shown in FIG. 9. The encoder plate 129a has radial slits at a constant interval, and the photo interrupter 129b detects the slits of the encoder plate 129a. The pulse generator 129c generates a transport pulse at each detection of the slit. The transport pulse is sent to the controller 125.

The controller 125 rotates a film transport motor 135 through a motor driver 135a to rotate the spool drive shaft 118 through a reduction gear train 161, hereinafter called transport gear train 161. The controller 125 starts counting the transport pulses from a timing when the adhesive tape 116c is detected based on the sensor signal from the film sensor 123a. When the count of the transport pulses reaches a predetermined constant value N1, the controller 125 determines that a recording area for the first frame is placed behind the exposure aperture 112. After each exposure, the controller 125 compares the count of the transport pulses to a value corresponding to one frame. The controller 125 also controls a photometry section 130, an AF section 131, an exposure section 132, an LCD panel 134 and other elements of the camera in response to many switches including the back lid switch 121 and a release switch 133.

Referring back to FIG. 8, the camera body 111 has a pair of film rails 140 and 141 extending above and below the exposure aperture 112 along the film passageway 113. The film rails 140 and 141 protrude rearward from the camera body wall portions 113a and 113b and have respective film sliding surfaces 140a and 141a that extend parallel to a pressure plate 142. The film slip 116 is transported through the film passageway 113 with its side edge portions of its emulsion surface sliding on the film sliding surfaces 140a and 141a.

Figure 11:
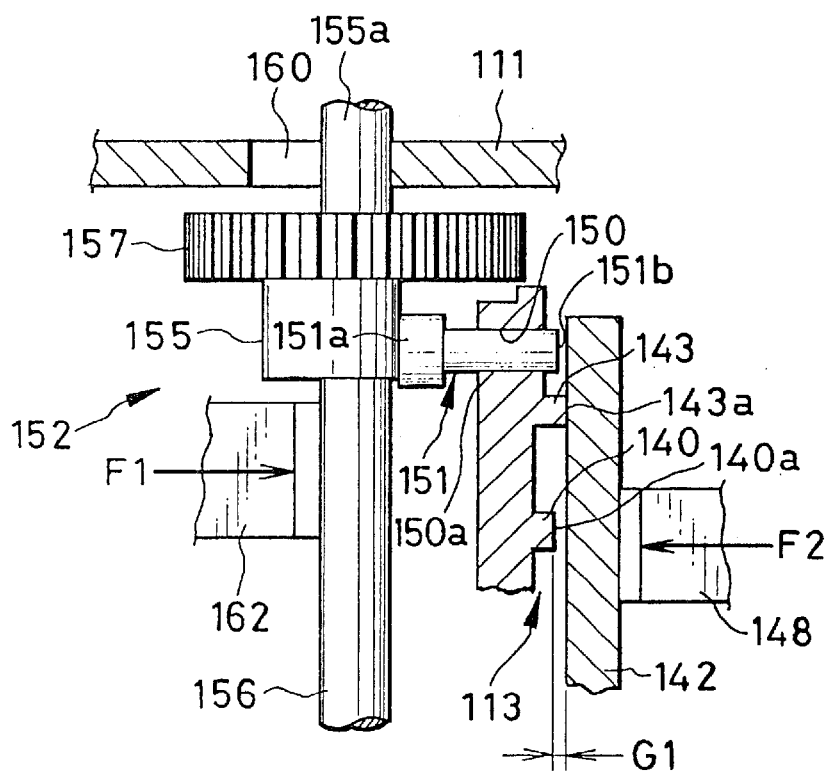
FIG. 11 is an enlarged view illustrating the pressure plate switching mechanism in a first position providing a minimum tunnel gap.

Outside the film rails 140 and 141 from the exposure aperture 112 are provided a pair of pressure plate rails 143 and 144 that also extend along the film passageway 113. The pressure plate rails 143 and 144 protrude more than the film rails 140 and 141 rearward from the camera body wall portions 113a and 113b, as shown in FIG. 11. The pressure plate rails 143 and 144 have pressure plate stopping surfaces 143a and 144a that is parallel to the pressure plate 142. The pressure plate rails 143 and 144 are spaced from each other a distance that is slightly larger than a width of the film slip 116, so the pressure plate rails 143 and 144 also confine and guide the side edges of the film slip 116 along their inside surfaces that face the film rails 140 and 141. A difference in height between the film sliding surface 140a or 141a and the pressure plate stopping surface 143a or 144a provides a tunnel gap G1 for the 220-type roll film. According to this embodiment, the tunnel gap G1 is 0.235±0.05 mm.

As shown in FIG. 8, the pressure plate 142 is mounted to the back lid 110 through a pair of mounting members 146 and a pair of guide pins 147, such that the pressure plate 142 is movable along an optical axis of the camera. A pair of leaf springs 148 are mounted to the inside wall of the back lid 110, to urge the pressure plate 142 toward the film passageway 113 while the back lid 110 is closed. Instead of using the mounting members 146 and the sliding pins 147, it is possible to hold the pressure plate 142 at free ends 148a of the leaf springs 148 so as to be movable in the optical axis direction.

Figure 12:
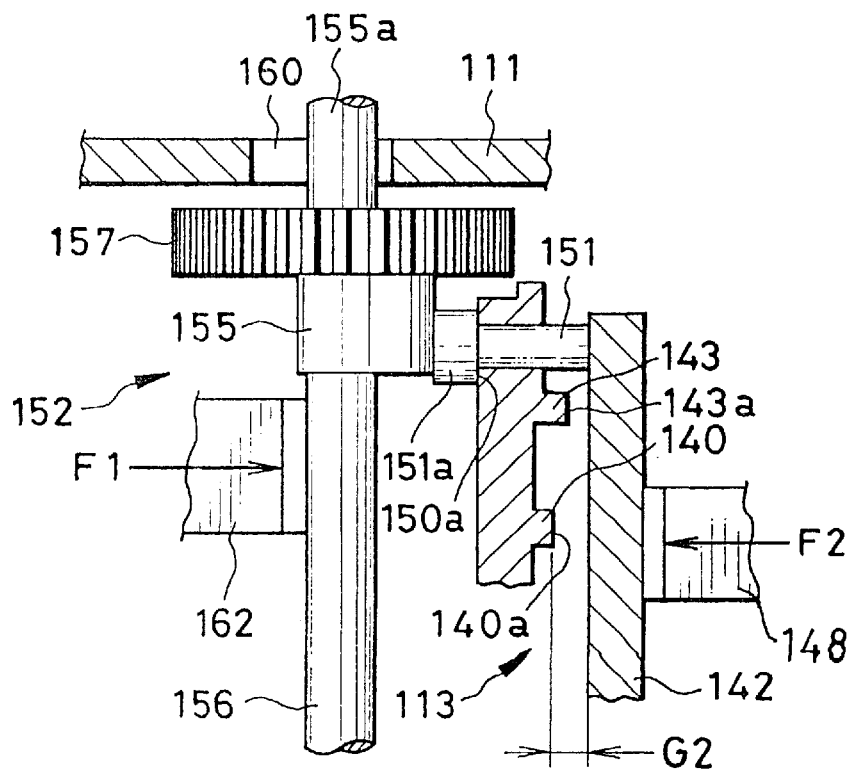
FIG. 12 is an enlarged view illustrating the pressure plate switching mechanism in a second position providing a maximum tunnel gap.

Four guide holes 150 are formed through the camera body wall portions 113a and 113b near the corners of the exposure aperture 112 but outside the upper pressure plate rails 143 and 144 from the aperture 112. The guide holes 150 guides pushing pins 151 in the optical axis direction. The pushing pins 151 are inserted in the guide holes 150 from the front side of the camera body 111, that is, the opposite side of the camera body wall portions 113a and 113b from the pressure plate 142. As shown in FIGS. 11 and 12, each of the pushing pins 151 has a flange 151a. As the flange 151a is brought into contact with a rim 150a of the guide hole 150, the amount of protrusion of the pushing pin 151 into the film passageway 113 is limited.

The four pushing pins 151 are moved in the optical axis direction by being pushed by four pushing cams 155 that are placed in contact with the flanges 151a of the individual pushing pins 151. As shown in FIG. 10, an upper one of the pushing cams 155 is connected to a lower one through a vertical interconnection rod 156 on either side of the exposure aperture 112. A gear 157 is coaxially coupled to each of the upper pushing cams 155. The gears 157 are connected to a pressure plate switching motor 136 through a second reduction gear train 158, hereinafter called switching gear train 158.

The pressure plate switching motor 136 is rotated by the controller 125 when the film transport motor 135 receives a pressure plate switching signal. The switching gear train 158 transmits the rotation of the pressure plate switching motor 136 to the pushing cams 155 after reducing the speed of rotation. The rotation of the pushing cams 155 make the pushing pins 151 move in the optical axis direction. When the pushing cams 155 rotates from the position shown in FIG. 11 to the position shown in FIG. 12, the pushing pins 151 protrude more into the film passageway 113 than the pressure plate stopping surfaces 143a and 144a of the pressure plate rails 143 and 144. Thus, the pushing pins 151 pushes the pressure plate 142 toward the back lid 110, enlarging the tunnel gap from G1 to G2. The pushing pins 151, the pushing cams 155 and the interconnection rods 156 constitute a pressure plate switching mechanism 152. The two pushing cams 155 on the side of the film supply chamber 114 are designed to rotate in the opposite direction to the two pushing cams 156 on the side of the film take-up chamber 115 for shifting the four pushing pins 151 in the same direction. However, it is possible to design the four pushing cams 155 to rotate in the same direction for shifting the four pushing pins 151 in the same direction.

As shown in FIG. 10, a motor rotation encoder 168 is coupled to the drive shaft of the pressure plate switching motor 136. The motor rotation encoder 168 has the same construction as the transport encoder 129, consisting of an encoder plate 168a with a notch, a photo interrupter 168b and a not-shown pulse generator. The photo interrupter 168b outputs a motor rotation pulse each time it detects the notch of the encoder plate 168a. The motor rotation pulses are sent to the controller 125, and the controller 125 counts the motor rotation pulses as the number of rotation of the pressure plate switching motor 136. In the same way, the spool drive shaft 118 is coupled to a spool rotation encoder 169 that generates spool rotation pulses by detecting slits of an encoder plate 169a with a photo interrupter 169b.

As shown in FIGS. 11 to 14, an eccentric pivot 155a of each of the pushing cam 155 is rotatably inserted in a slot 160 that is elongated in the optical axis direction, so the pivot 155a of the pushing cam 155 can move in the optical axis direction inside the slot 160. A pair of cam springs 162 are provided to urge the interconnection rods 156 toward the pressure plate 142. The cam springs 162 has a larger urging force F1 than an urging force F2 of the leaf springs 148 that urges the pressure plate 142 toward the camera body 111.

Figure 13:
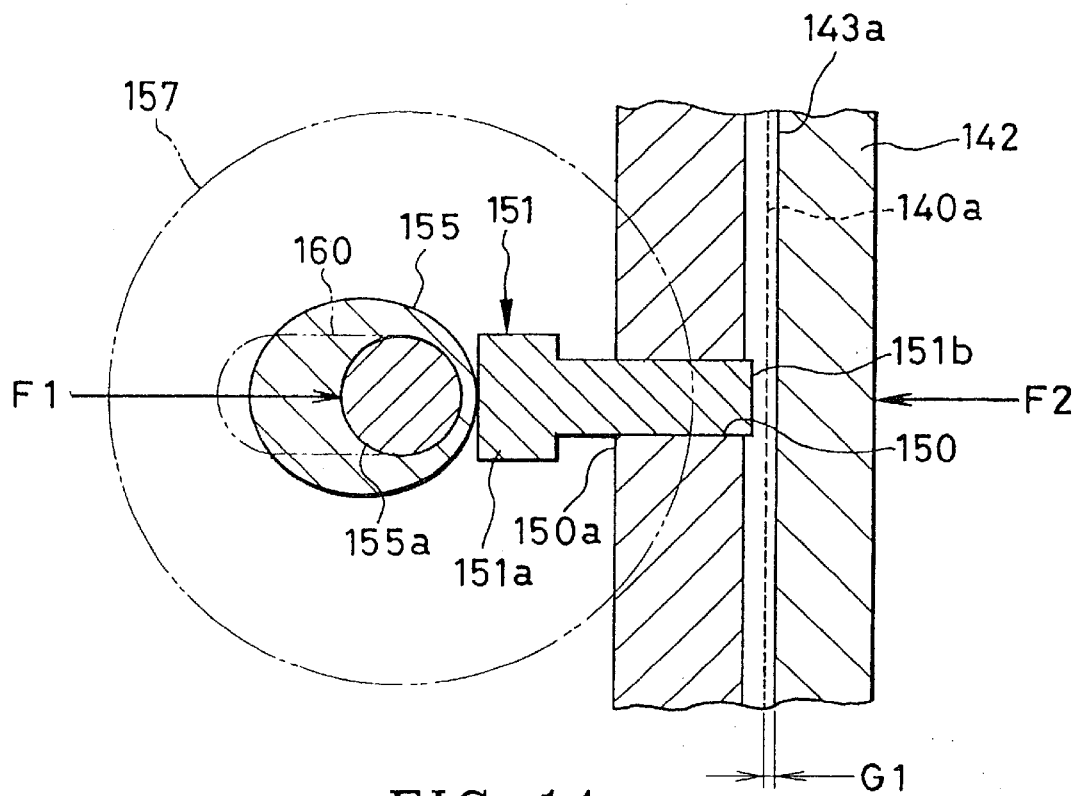
FIG. 13 is a sectional view illustrating the pressure plate switching mechanism in the first position providing the minimum tunnel gap.

In the rotational position of the pushing cams 155 for the 220-type, as shown in FIGS. 11 and 13, the pivots 155a of the pushing cams 155 are pressed against one terminals of the slots 160 according to the urging force of the cam springs 162, but the pushing cams 155 push the pushing pins 151 by the smallest amount. The ends 151b of the pushing pins 151 do not protrude more than the pressure plate rails 143 and 144 toward the pressure plate 142, so that the pressure plate 142 is pressed onto the pressure plate stopping surfaces 143a and 144a according to the urging force of the leaf springs 148.

Figure 14:
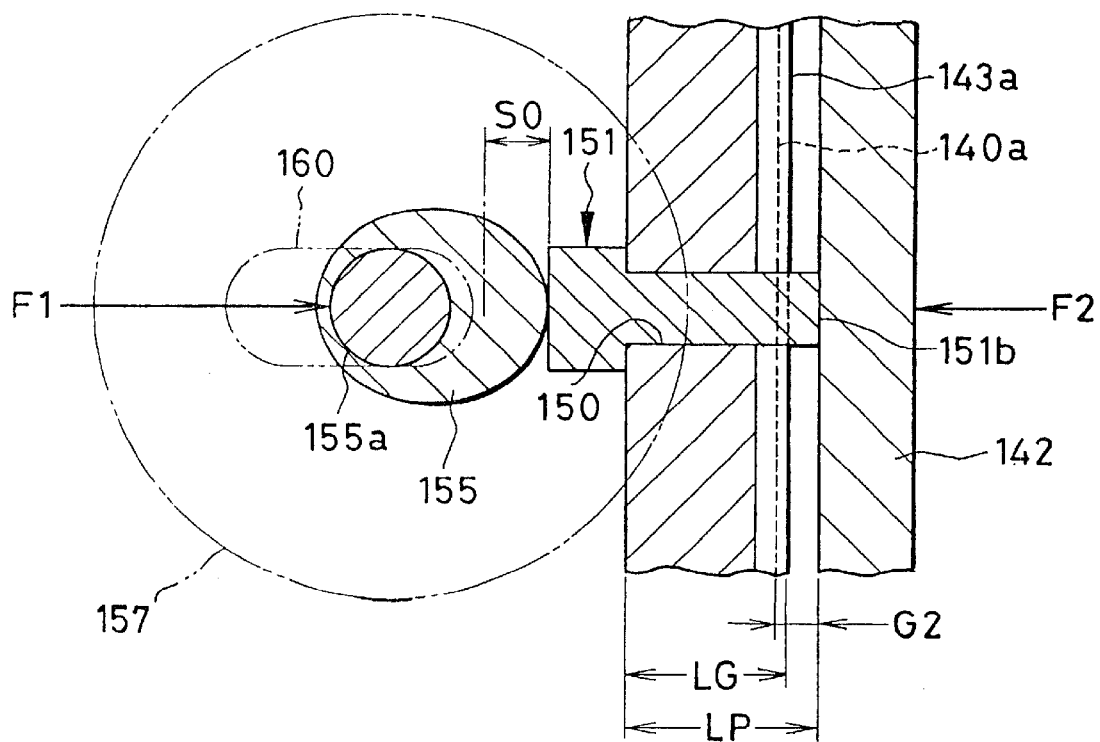
FIG. 14 is a sectional view illustrating the pressure plate switching mechanism in the second position providing the maximum tunnel gap.

FIGS. 12 and 14 show the rotational position of the pushing cams 155 for the 120-type roll film, wherein the pushing pins 151 are moved by an amount S0 toward the pressure plate 142 from the rotational position for the 220-type roll film as shown in FIGS. 11 and 13. The cam springs 162 urges the pushing pins 151 such that the flanges 151a are brought into tight contact with the rims 150a of the guide holes 150. Thereby, the pushing pins 151 always protrude the same amount into the film passageway 113 when the pushing cams 155 rotate to the position for the 220-type roll film. According to this configuration, even if there is a variation in the shifting amount of the pushing pins 151 by the pushing cams 155, if the distance LG from the rims 150a of the guide holes 150 to the film sliding surfaces 140a and 141a of the film rails 140 and 141 and the distance LP from the flanges 151a to ends 151b of the pushing pins 151 are precise, the tunnel gap between the pressure plate 142 and the film sliding surface 140a is accurately set to be the constant value G2, i.e., 0.4±0.02 mm, in the position for the 120-type roll film.

As shown in FIG. 10, an indication drum 170 is disposed above the gear 157 that rotates the upper pushing cam 155 on the film supply chamber side. The indication drum 170 has indicia "120" and "220" on its periphery for indicating through a not-shown rear window of the camera body 111 whether the pressure plate 142 is set in the 120-type position or the 220-type position.

A tunnel gap detection switch 171 is provided on opposite side of the other upper pushing cam 155 from the pushing pin 151. The tunnel gap detection switch 171 has a pair of contact strips 171a and 171b. When the pushing cams 155 are in the 120-type position, the contact strip 171a is pushed by the opposing pushing cam 155 into contact with the contract strip 171b, so that the tunnel gap detection switch 171 electrically detects the position of the pressure plate 142. i.e., whether the tunnel gap is G1 or G2. The electric signal from the tunnel gap detection switch 171 is sent to the controller 125, so the controller 125 determines the roll film type based on the electric signal. If, for example, the electric signal shows that the tunnel gap is G1, the controller 125 determines the loaded roll film to be the 220-type. The controller 125 then determines the exposure number available from the loaded roll film according to the roll film type.

Now the operation of the second embodiment will be described with reference to FIGS. 15 to 17.

Figure 15:
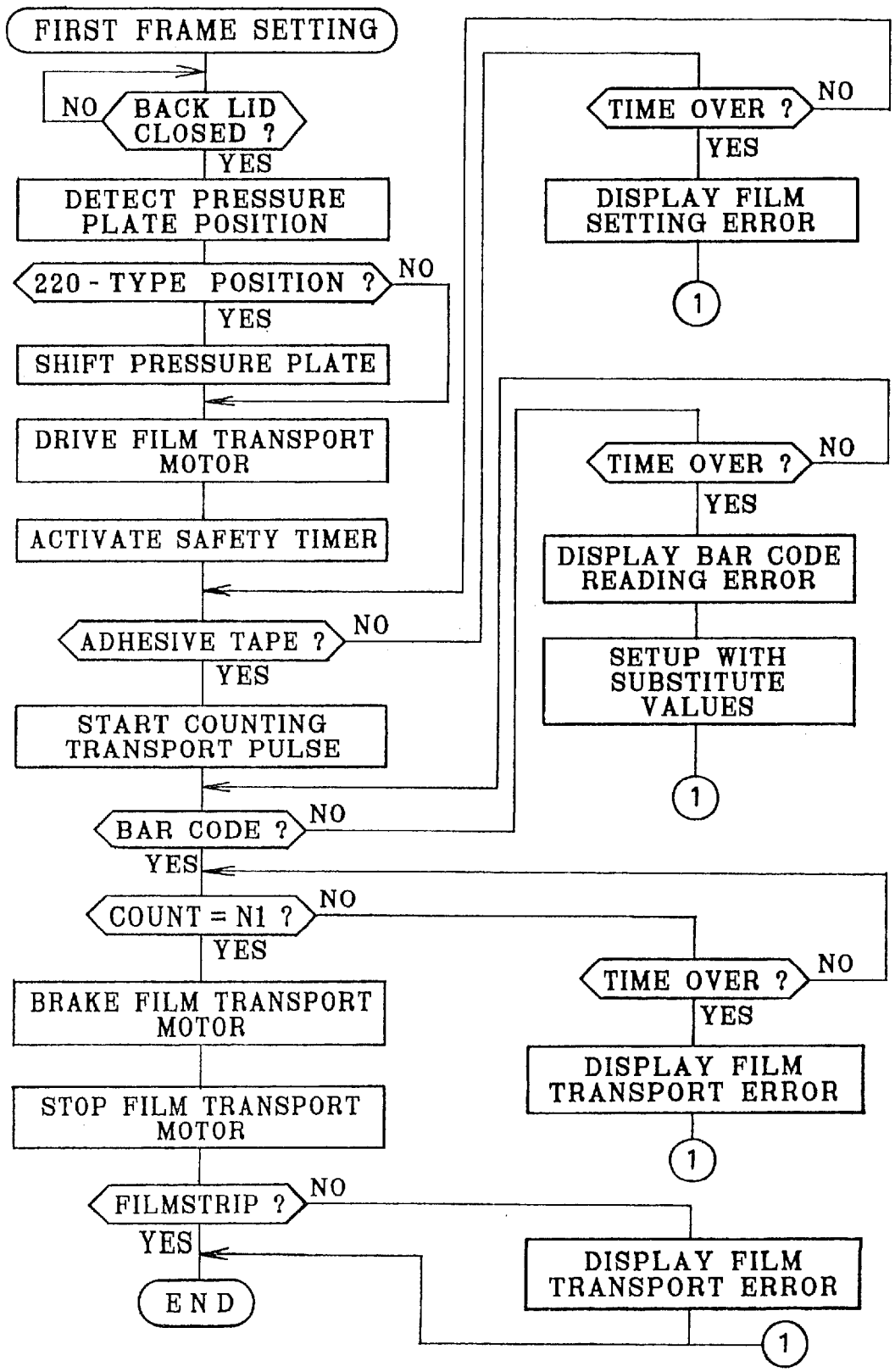
FIG. 15 is a flow chart illustrating a first frame setting program of the camera shown in FIG. 8, for setting a first frame exposure area to an exposure position.
Figure 16:
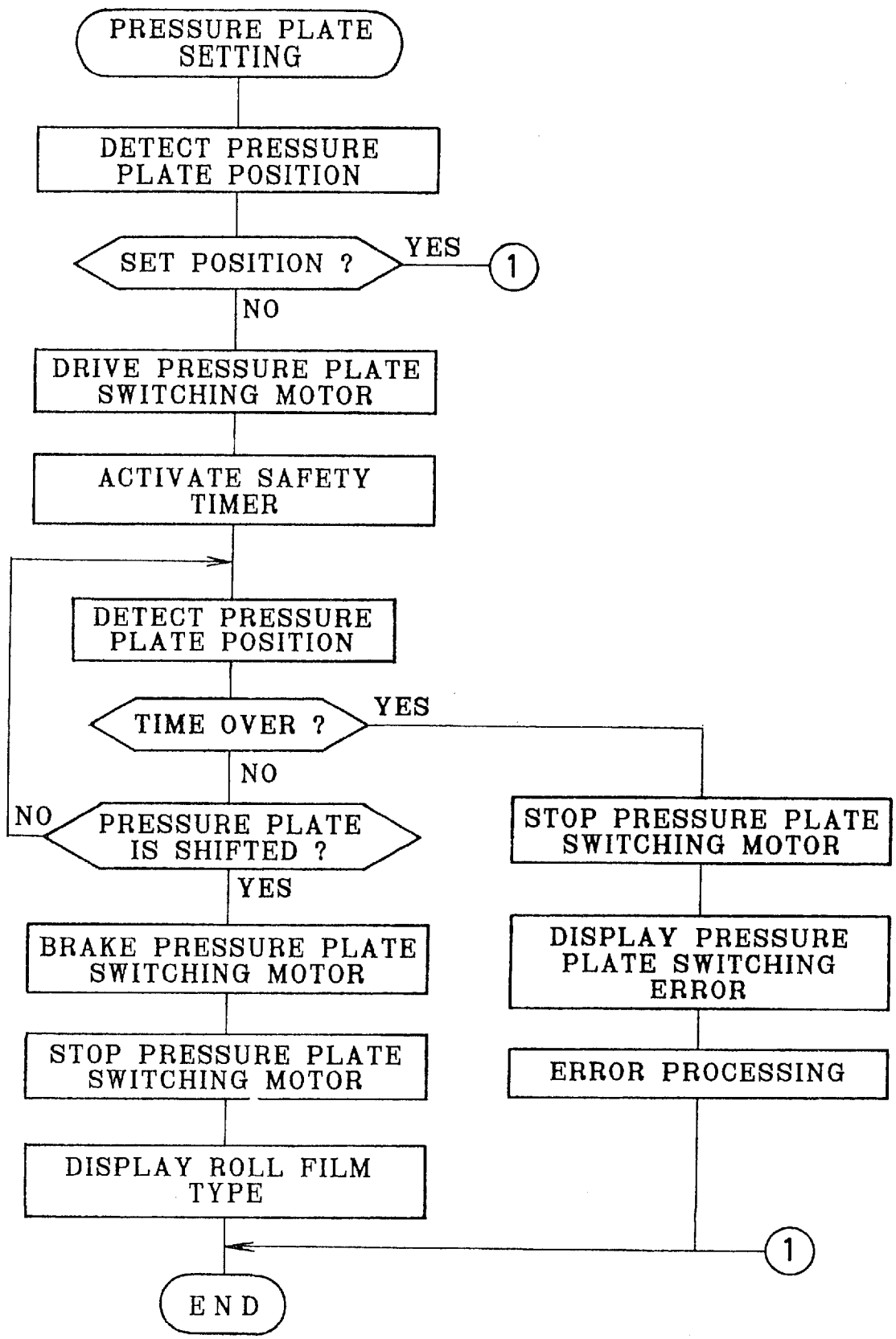
FIG. 16 is a flow chart illustrating a pressure plate setting program of the camera shown in FIG. 8, for shifting a pressure plate to a set position.

The controller 125 first executes a first frame setting program as shown in FIG. 15. When the back lid switch 121 detects that the back lid 110 is closed after the roll film is loaded, the controller 125 first checks the position of the pressure plate 142 based on the electric signal from the tunnel gap detection switch 171. If the pressure plate 142 is set in the 220-type position, the controller 125 shifts the pressure plate 142 to the 120-type position. If the pressure plate 142 is still set in the 120-type position, the position of the pressure plate 142 is maintained unchanged. In this way, for the first frame setting, the tunnel gap is set to the larger value G2, so that not only the 120-type film slip 116 but also the thinner 220-type film slip can move smoothly along the film passageway 113.

Next, the film transport motor 135 is activated to start transporting the film slip 116, and a safety timer is activated simultaneously. Thereafter, the film sensor 123a determines whether the adhesive tape 116c goes past the front of the film sensor 123a. If the film sensor 123a does not detect the adhesive tape 116c in a given time, the controller 125 detects a film setting error, and displays a corresponding indicia on the LCD panel 134. When the adhesive tape 116c is detected, the controller 125 starts counting the transport pulses, while the bar code sensor 123b reads the bar code 124 on the adhesive tape 116c. Based on the output signal from the bar code sensor 123b, the controller 125 identifies the type of the loaded roll film. Thereafter when the count of the transport pulses reaches the constant value N1, the controller 125 brakes the film transport motor 135 by driving the motor 135 in the opposite direction at a speed of 50 ms, to stop the motor 135.

If the bar code 124 are not read in a given time, the controller 125 determines it as a bar code reading error, and displays a corresponding indicia on the LCD panel 134. In that case, the controller 125 always sets the pressure plate 142 to the 120-type position, but sets the initial value of the available exposure number to "32" that is for the 220-type roll film. This is because the 120-type is more widely used than the 220-type, and the tunnel gap G2 for the 120-type is wider than the gap G1 for the 220-type. As the initial available exposure number is set to "32", even if the loaded roll film is of 220-type, it is possible to take photographs on the entire frame recording area of the roll film, though the images get a little out of focus. Also, the controller 125 regards the film speed of the loaded roll film as the most popular ISO 100, and the type of the filmstrip 116b as the most popular color negative film. However, the preference in the roll film type differs from individual to individual. Therefore, it is preferable to make it possible for the photographer to preset substitute values for use in a case of bar code reading error.

Besides, if the count of the transport pulses does not reach the given number N1 in a given time, the controller 125 determines it as a film transport error, and displays a corresponding indicia on the LCD panel 134. Then, the controller 125 stops the film transport motor 135, and checks the output signal from the film sensor 123a to determine whether the film slip 116 is in front of the film sensor 123a. If the answer is yes, the controller 125 considers that the first frame setting is normally carried out, and displays "1" as a frame number on the LCD 134. Thus, the camera is ready for photography. If the film sensor 123a does not detect the film slip 116, the LCD 134 continues to display the indicia of film transport error.

When the bar code 124 is read normally, the controller 125 sets the pressure plate 142 according to the roll film type indicated by the bar code 124. In the pressure plate setting program as shown in FIG. 16, the tunnel gap detection switch 171 first detects whether the present pressure plate position is for 120-type or 220-type. The controller 125 determines if the present pressure plate position is a set position suitable for the roll film type indicated by the bar code 124. If not, the controller 125 drives the pressure plate switching motor 136 and, at the same time, activates the safety timer. When the tunnel gap dtection switch 171 detects that the pressure plate 142 is switched over, the pressure plate switching motor 136 is braked by being driven in the opposite direction at a speed of 50 ms, and is stopped. Thereafter, the LCD panel 134 revises the roll film type of the loaded film. If the position of the pressure plate 142 is not switched over in two seconds after the activation of the pressure plate switching motor 136, the controller 125 stops the pressure plate switching motor 136 and displays an indicia of pressure plate switching error on the LCD panel 134. Then, the controller 125 makes an error processing, wherein the pressure plate switching motor 136 is driven again to switch over the position of the pressure plate 142 in response to a manually entered pressure plate switching signal. If the pressure plate 142 is not switched over even in the error processing, the LCD panel 134 displays a failure indicia.

After each exposure, the film transport motor 135 is rotated to transport the film slip 116 by one frame amount. To measure the one frame amount of the film slip 116, the transport pulses from the transport encoder 129 are counted. Also the frame number on the LCD 134 increments one count after each exposure.

Figure 17:
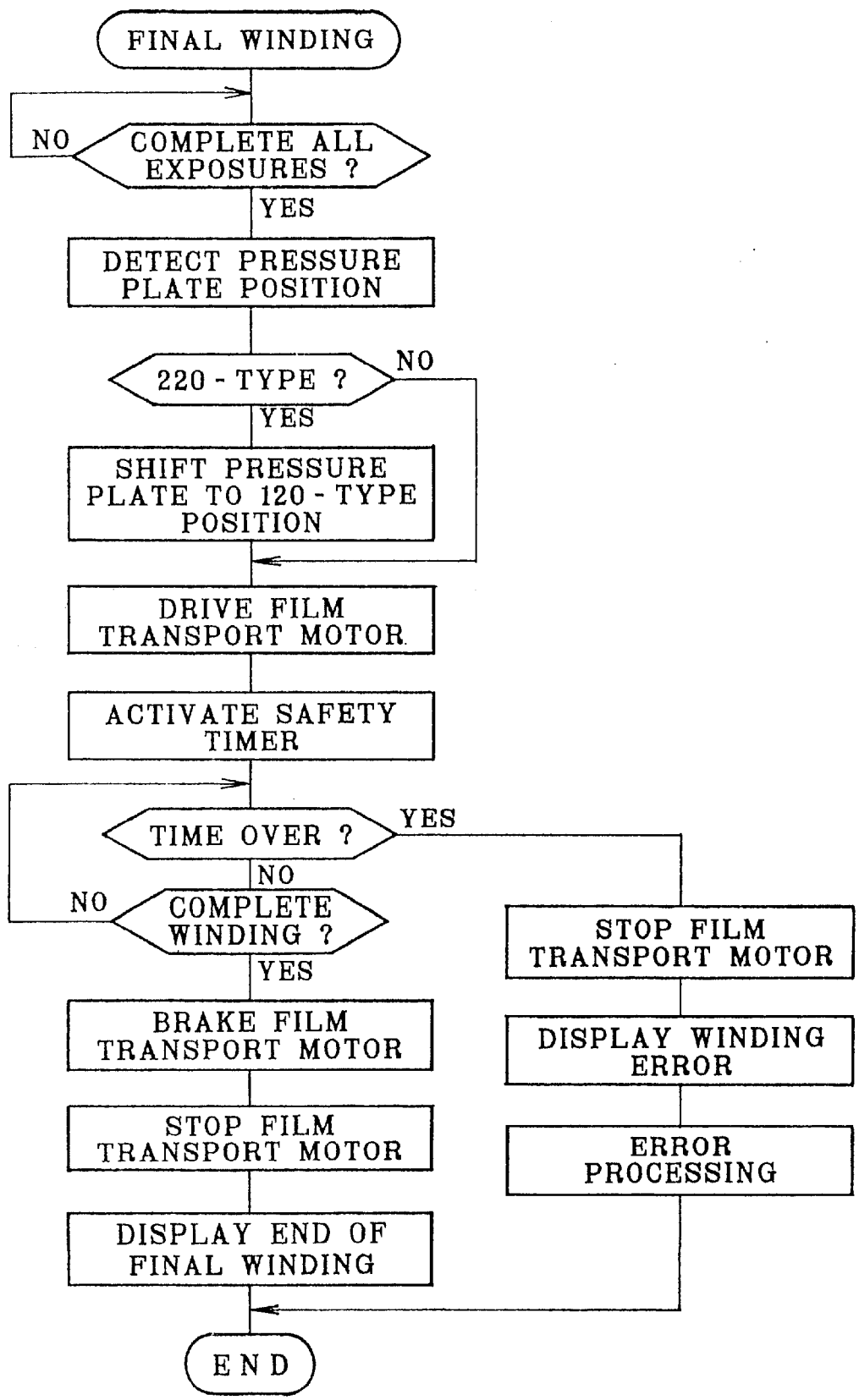
FIG. 17 is a flow chart illustrating a final winding program of the camera shown in FIG. 8, for winding up the entire length of the film slip onto a take-up spool.

After the completion of all available exposures, the controller 125 executes a final winding program as shown in FIG. 17. In the final winding sequence, the controller 125 makes the film passageway 113 have the maximum tunnel gap G2 regardless of the roll film type. Thereafter, the film transport motor 135 is driven to wind up the entire length of the film slip 116 onto the spool 117 of the film take-up chamber 115. When the final winding is complete, the display panel 134 displays "E". Then, the back lid 110 may be opened to take off the exposed roll film. The spool 117 in the film supply chamber 114 is transferred to the film take-up chamber. Since the film passageway 113 has the maximum tunnel gap G2 during the final winding as well as the first frame setting, the film slip 116 is smoothly taken up onto the spool 117 of the film take-up chamber 115.

In this way, the position of the pressure plate 142 is automatically set according to the roll film type detected during the first frame setting, and is maintained unchanged during the photography even while the power source is turned off. Therefore, it is easy to confirm the type of the loaded roll film by the indicia on the indication drum 170 that is visible through the not-shown rear window.

Figure 18:
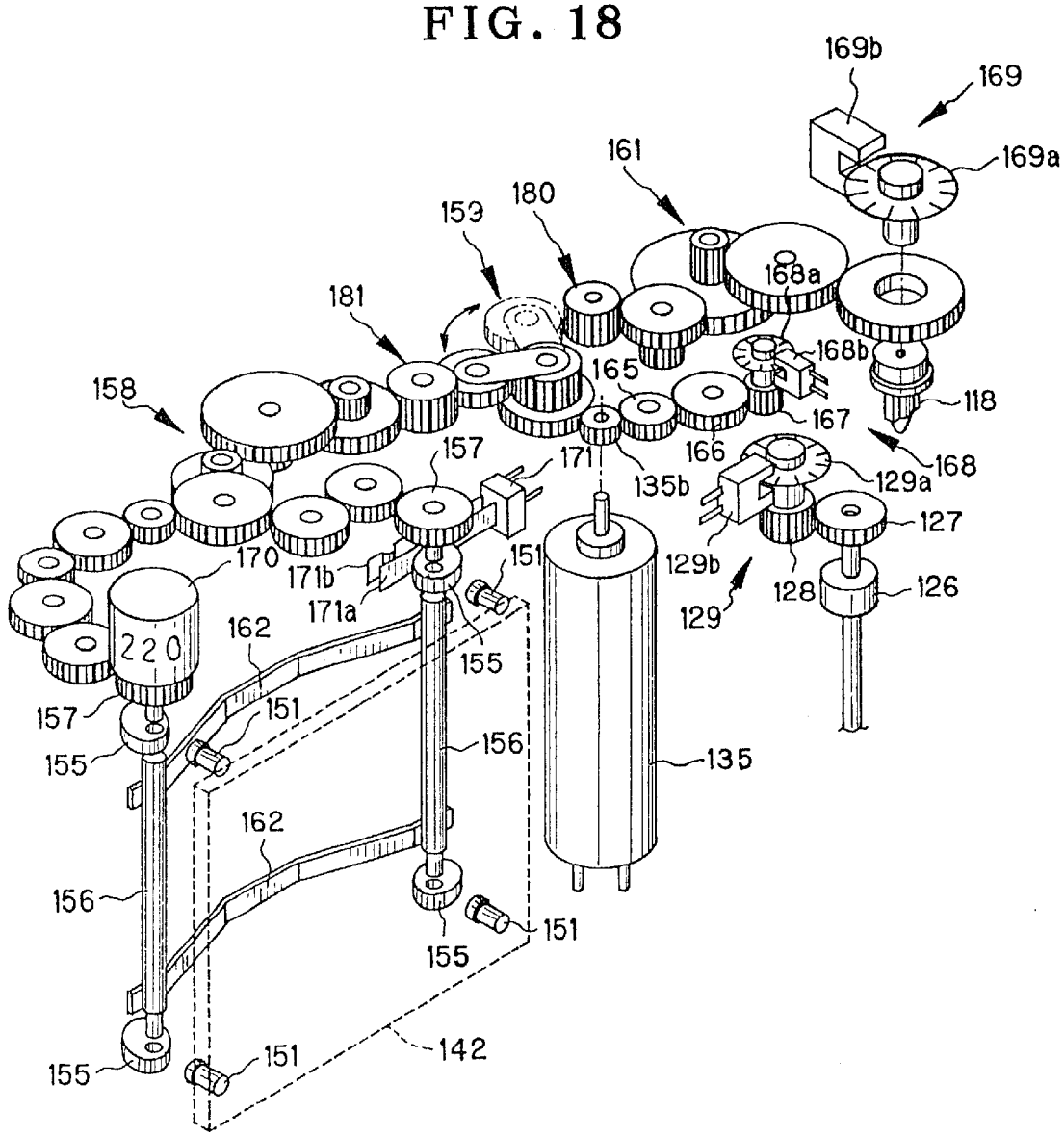
FIG. 18 is a schematic diagram illustrating another embodiment of the invention, wherein a sun and planet gear clutch selectively transmits rotational movement of a single motor either to a film transporting mechanism or to a pressure plate switching mechanism.
Figure 19:
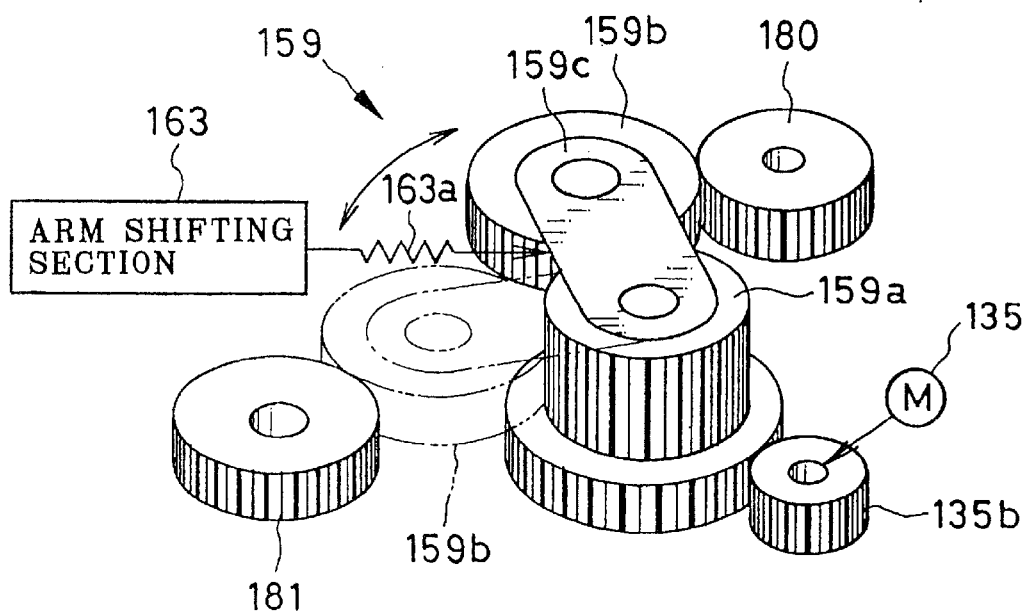
FIG. 19 is an enlarged view illustrating the sun and planet gear clutch shown in FIG. 18.

According to another embodiment, as shown in FIG. 18, the pressure plate switching motor 136 is omitted, and a sun and planet gear clutch 159 is coupled to a film transport motor 135 so the film transport motor 135 is alternatively used for transporting the film slip 116 or for switching a pressure plate 142. As shown in FIG. 19, the sun and planet gear clutch 159 is constituted of a sun gear 159a, a planetary pinion 159b, an arm 159c connecting the planetary pinion 159b to the sun gear 159a such that the planetary pinion 159b can make the planetary motion, and an arm shifting section 163.

The arm shifting section 163 includes a solenoid that acts on the arm 159c through a coiled spring 163a, such that when the solenoid of the arm shifting section 163 is not activated the arm 159c is in a position where the planetary pinion 159b interlocks a drive gear 180 of a film transport gear train 161 as shown in FIG. 18. Thus, the rotation of the film transport motor 135 is transmitted to a spool drive shaft 118. When the solenoid of the arm shifting section 163 is activated upon a pressure plate switching signal, the arm 159c is rotated to interlock the planetary pinion 159b with a drive gear 181 of a switching gear train 158. Thus, the rotation of the film transport motor 135 is transmitted to pushing cams 155 through gears 157.

Figure 20:
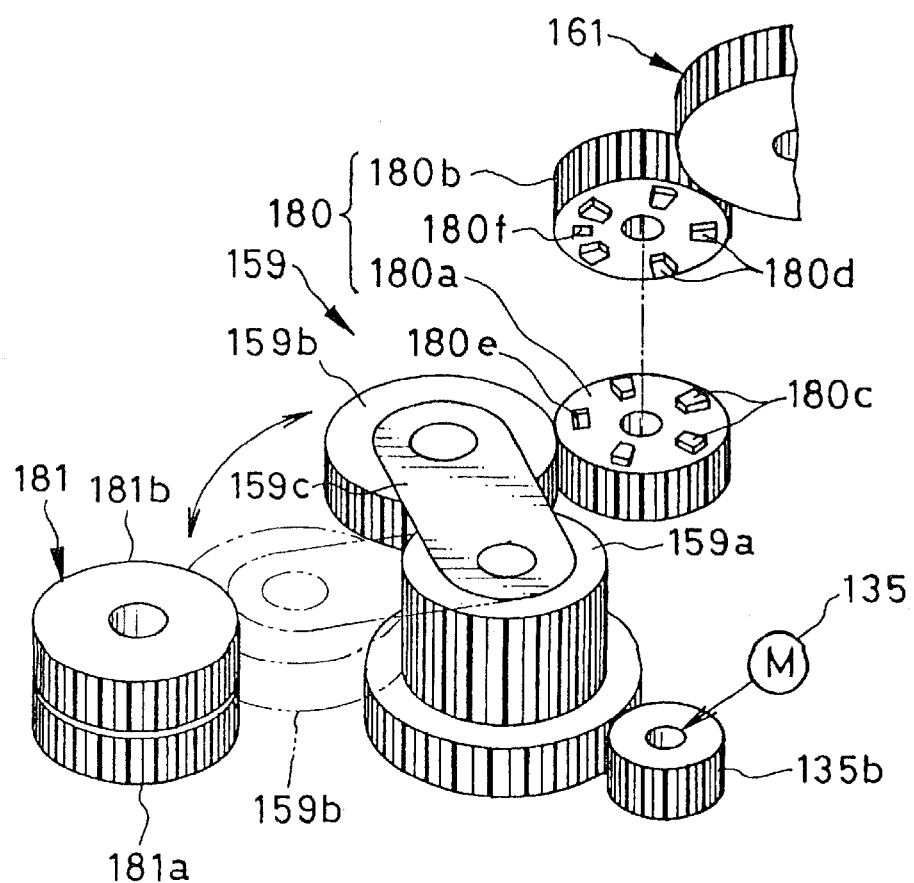
FIG. 20 is another embodiment of the sun and planet gear clutch shown in FIG. 18, wherein drive gears which are alternatively engaged with a planatory pinion of the clutch have a double-gear mechanism.
Figure 21:
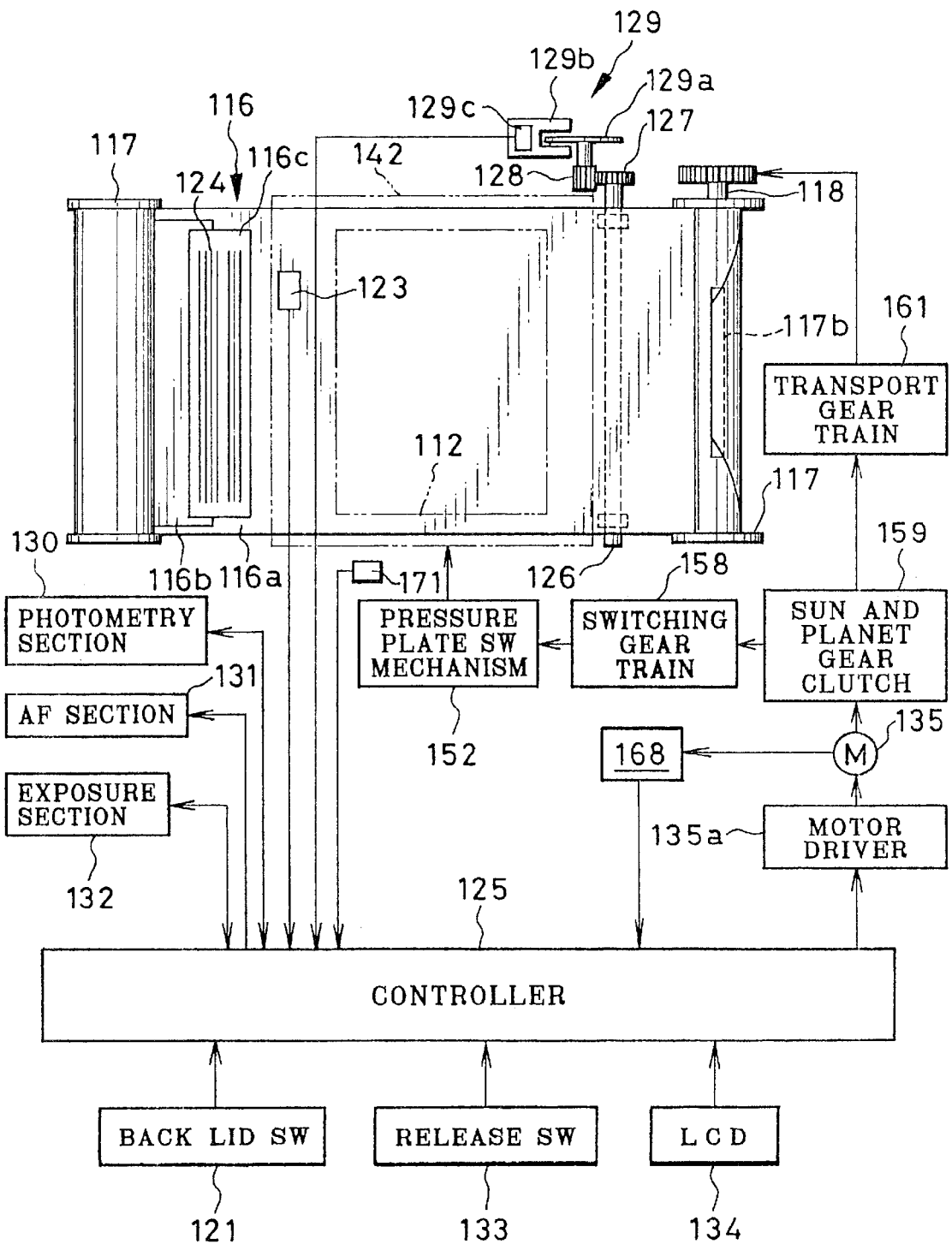
FIG. 21 is a schematic diagram illustrating an electric construction of the embodiment shown in FIG. 18.

According to a modification shown in FIG. 20, the arm shifting section 163 is omitted, and the power transmitting direction is switched over depending upon the rotational direction of the film transport motor 135. Specifically, when the film transport motor 135 rotates in the film transporting direction, the sun gear 159a rotates clockwise, and the planetary pinion 159 rotates clockwise around the sun gear 159a until the planetary pinion 159 comes into mesh with the drive gear 180 of the transport gear train 161. As a result, the spool drive shaft 118 is rotated by the rotational movement of the film transport motor 135, to wind up the film slip 116. On the contrary, when the film transport motor 135 rotates reversely to the film transporting direction, the sun gear 159a rotates counterclockwise, and the planetary pinion 159b is brought into mesh with the drive gear 181 of the switching gear train 158. FIG. 21 shows a circuitry for the embodiment shown in FIG. 20.

According to the configuration shown FIG. 20, to change over the power transmitting direction, the sun gear 159a changes its rotational direction as the film transport motor 135 changes its rotational direction. Because the planetary pinion 159b is in mesh with the drive gear 180 or the drive gear 181 at the beginning of changing the rotational direction of the sun gear 159a, the drive gear 180 or 181 is a little rotated reversely through the planetary pinion 159b. If the reverse rotation is transmitted to the transport gear train 161 through the drive gear 180 after the positioning of the film slip 116, the spool drive shaft 118 rotates a little in the opposite direction to the film transport direction, so that the film slip 116 is a little unwound. In the same way, if the reverse rotation is transmitted to the switching gear train 158 through the drive rear 181 after the positioning of the pressure plate 142, the gears 157 rotate a little in the opposite direction. Thereby, the rotational position of the pushing cams 155 changes a little, that may result in changing the position of the pressure plate 142.

To prevent the unwinding of the film slip 116 or the undesirable movement of the pressure plate 142, the drive gears 180 and 181 have a double gear mechanism as shown in FIG. 20. That is, the drive gear 180 consists of upper and lower gear members 180a and 180b which are coaxial with each other, and are interlocked with each other through radial projections 180c and 180d. The lower gear member 180a also has a leaf spring 180e that protrudes upward from its top surface, whereas the upper gear member 180b has a recess 180f in its bottom surface, for accepting the leaf spring 180e. The leaf spring 180e is located such that the projections 180c and 180d are spaced approximately equally from each other in the interlocked position. For example, four radial projections 180c and a leaf spring 180e are formed on a top surface of the lower gear member 180a at an interval of 72°, whereas five radial projections 180d are formed on a bottom surface of the upper gear member 180b at an interval of 72°. Thereby, the gear members 180a and 180b are rotatable a limited angle relative to each other.

According to the double gear mechanism, although the counterclockwise rotation of the sun gear 159a on changing the power transmitting direction to the switching gear train 158 is transmitted to the drive gear 180 at the first stage, the counterclockwise rotation is absorbed by the rotation of the lower gear member 180a relative to the upper gear member 180b. Therefore, the counterclockwise rotation of the sun gear 159a, that would rotate the spool drive shaft 118 in the unwinding direction, is not transmitted to the transport gear train 161. The drive gear 181 has the same double gear mechanism, consisting of lower and upper gear members 181a and 181b, as the drive gear 180. Therefore, the clockwise rotation of the sun gear 159a reverse to the pressure plate switching direction, which is transmitted to the drive shaft 181 at the beginning of changing the power transmitting direction to the transport gear train 161, is absorbed by the rotation of the lower gear member 181a relative to the upper gear member 181b. Therefore, the clockwise rotation of the sun gear 159a is not transmitted to the switching gear train 158, and thus the pushing cams 155 are not affected by the change of the power transmitting direction.

It is to be noted that the same effect can be obtained without the leaf spring 180e. In that case, the contacting surfaces between the projections 180c and 180d changes as the rotational direction changes. It is also possible to use a one-way clutch instead of the double gear mechanism. It is not always necessary to provide the drive gear 181 with the double gear mechanism or the one-way clutch for absorbing or buffering the reverse rotation. The drive gear 181 of the switching gear train may be a single gear if the position of the pushing pins 151 does not change so far as the pushing cams 155 rotate within a range around each of the predetermined rotational positions.

Figure 22:
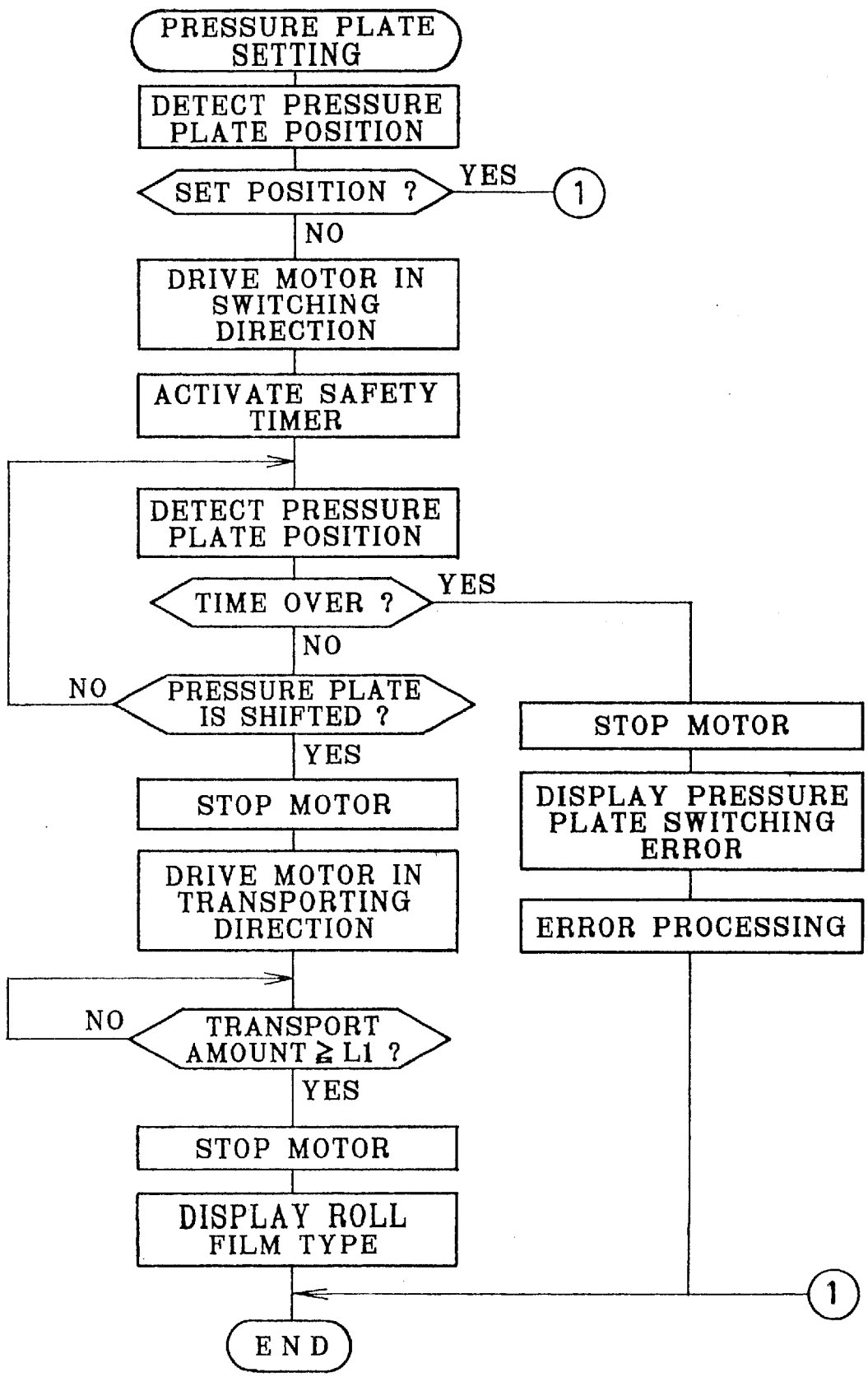
FIG. 22 is a flow chart illustrating a pressure plate setting program for the embodiment shown in FIG. 18.

FIG. 22 shows another preventive method against the unwinding of the film slip 116, that would be caused when the transmitting direction of the rotational movement of the single motor 135 is changed from the transport gear train 161 to the switching gear train through the sun and planet gear clutch 159. According to the embodiment of FIG. 22, neither the double gear mechanism nor the one-way clutch is used. Instead, after the pressure plate 142 is shifted, the spool drive shaft 118 is rotated to transport the film slip by a small amount L1 that is predetermined to be a little more than an average amount of the unwinding. In this way, a trouble that can occur if the filmstrip is exposed in the unwound position, e.g. double-exposure of part of the preceding image frame, will be eliminated. It is preferable to change the amount L1 depending upon the number of times the pressure plate position is changed in the same frame position. It is possible to determine the amount L1 to be a constant value corresponding to one frame, half frame, quarter frame, and the like. It is also possible to transport the film slip to cancel the unwound condition only after the tunnel gap is changed more than once or twice.

Figure 23:
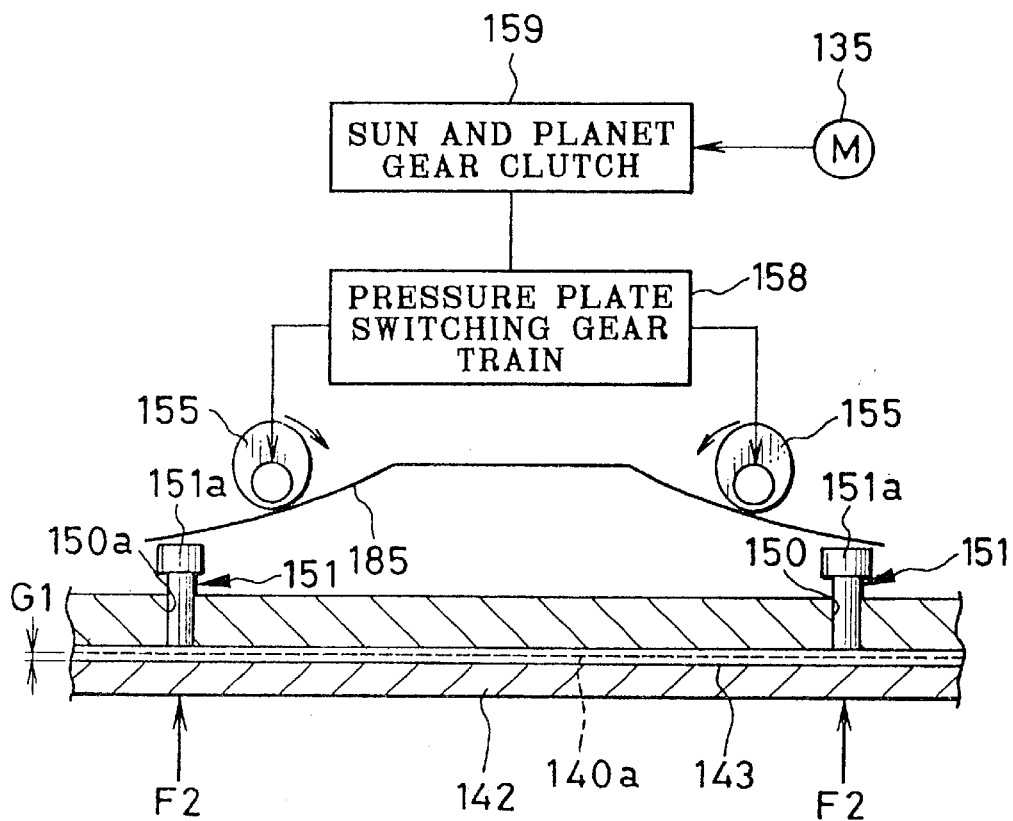
FIGS. 23 and 24 are schematic diagrams illustrating a pressure plate switching mechanism according to another embodiment of the invention.
Figure 24:
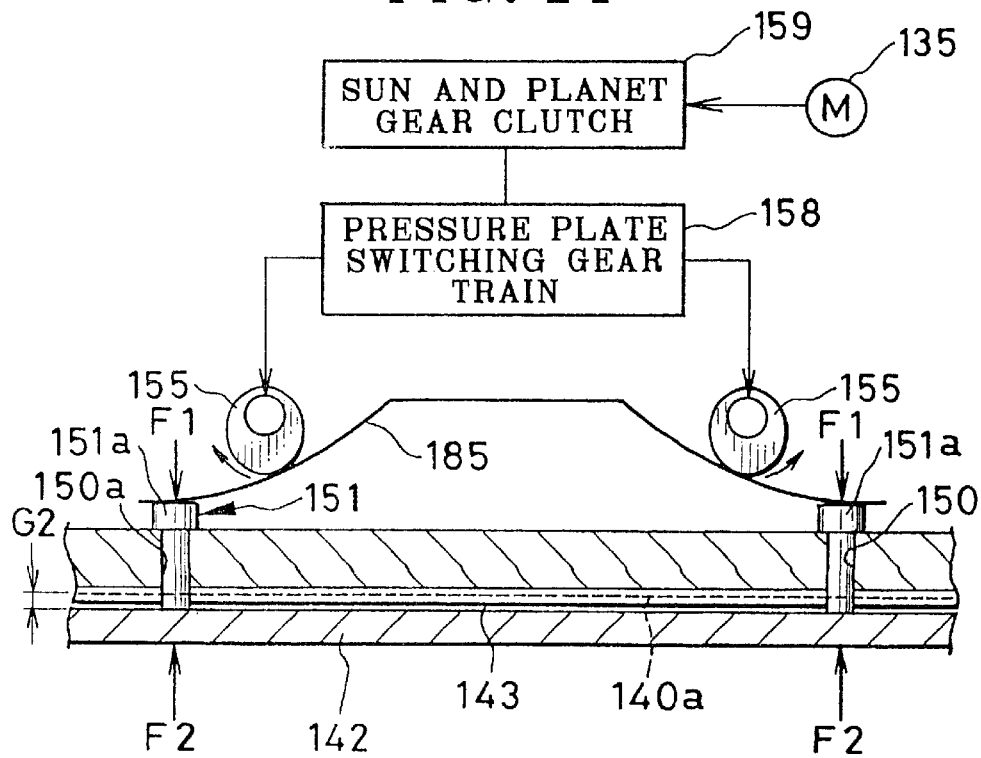

In the above embodiment, the pushing cams 155 and thus the pushing pins 151 are urged toward the pressure plate 142 by the cam springs 162 pushing the interconnection rods 156. As an alternative, the pushing cams 155 may be directly urged toward the pressure plate 142 by use of cam springs. It is also possible to urge the pushing pins 151 toward the pressure plate 142 by a leaf spring 185 provided in between pushing cams 155 and pushing pins 151, as is shown in FIGS. 23 and 24. According to this embodiment, the leaf spring 185 is bent by the pushing cams 155 as they rotate, thereby pushing the pushing pins 151 till their flanges 151a come to contact with the rims 150a of the guide holes 150.

Instead of pushing the pressure plate 142 directly by the pushing pins 151, it is possible to connect pressure plate rails to the ends 151b of the pushing pins 151, such that the pressure plate rails are movable with the pushing pins 151 in the optical axis direction. As a mechanism for shifting the pressure plate 142, a link mechanism, a lead screw mechanism, a lever mechanism or the like may be used instead of the cam mechanisms shown in the drawings.

It is also possible to omit the pushing pins 151 and shift the pressure plate 142 directly by pushing cams. The number of the pushing pins 151 is not limited to four, but may be three or more than four.

Figure 25:
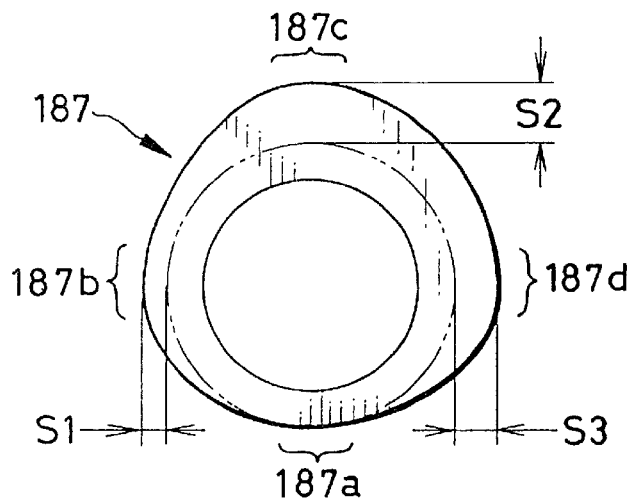
FIG. 25 is an explanatory view illustrating a pushing cam according to another embodiment of the invention.

Although the tunnel gap is switched over between the 220-type position and the 120-type position in the above embodiments, it is possible to provide other rotational positions for new type roll films having different thickness from both the 220-type and the 120-type roll films. For this purpose, pushing cams 183 having a contour as shown in FIG. 25 are useful. The pushing cam 183 has first to fourth rotational positions 187a, 187b, 187c and 187d. The first rotational position provides a minimum shifting amount. For example, the first rotational position is for the 220-type roll film. The second rotational position 187b is for shifting the pressure plate by an amount S1 from the first rotational position. The third rotational position 187c for shifting the pressure plate by a larger amount S2 than the amount S1 from the first rotational position 187a. The fourth rotational position 187d for shifting the pressure plate by a largest amount S3 from the first rotational position 187a. For example, the third rotational position 187c is for the 120-type roll film. However, the allocation of these four rotational positions as well as the shifting amounts S1 to S3 may be determined appropriately according the thicknesses of available type roll films. It is also possible to design the shifting cam such that the shifting amount changes continuously from a minimum value to a maximum value according to the rotational position of the pushing cam.

Figure 26:
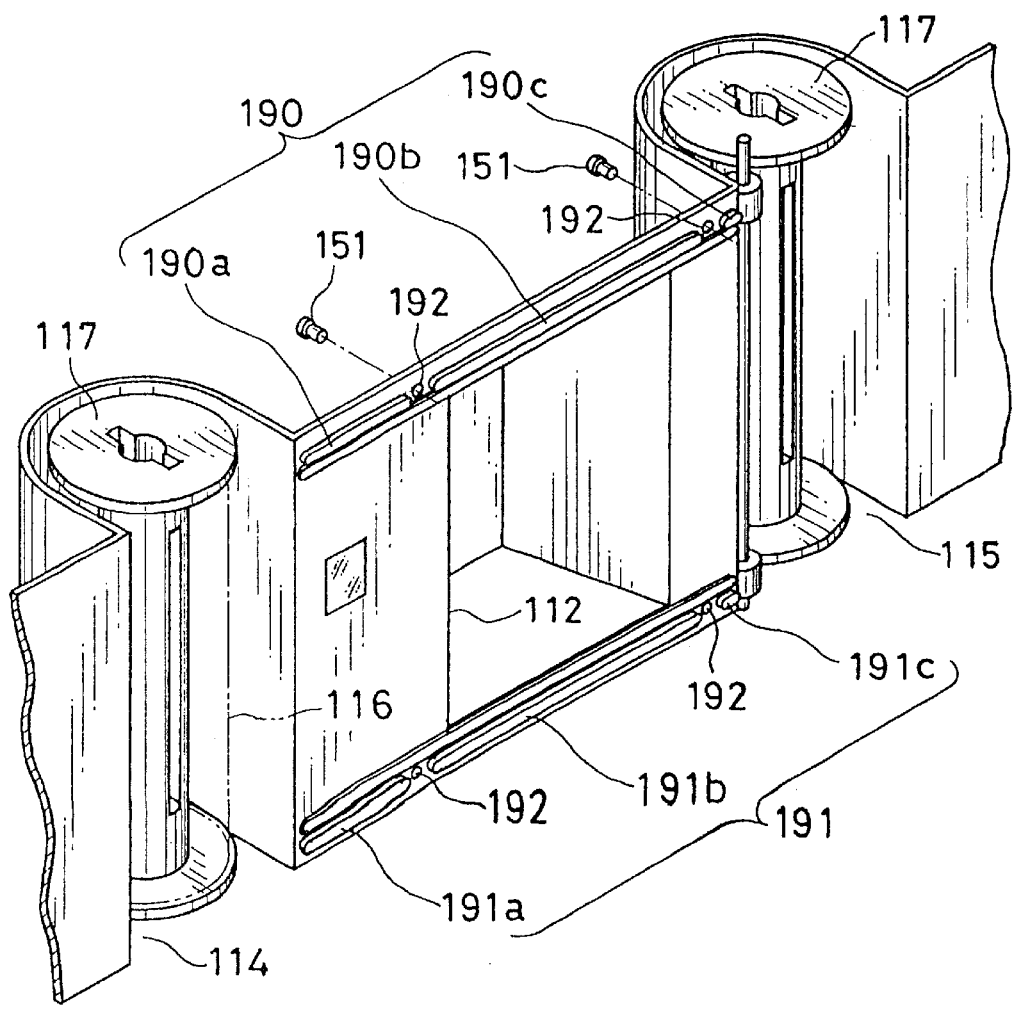
FIG. 26 is a schematic diagram illustrating a modification of the pressure plate switching mechanism shown in FIG. 8.

In the above embodiment, the guide holes 150 for guiding the pushing pins 151 in the optical axis direction are formed above the upper pressure plate rail 143 and below the lower pressure plate rail 144. However, as shown in FIG. 26, it is possible to separate upper and lower pressure plate rails 190 and 191 into three rail portions 190a, 190b and 190c; 191a, 191b and 191c, respectively, and locate guide holes 192 for the pushing pins 151 in between the three rail portions.

Although the position of the pressure plate 142 is automatically switched over according to the roll film type read from the bar code in the above embodiments, it is possible to drive the motor 135 or 136 to shift the pressure plate 142 in response to a switching signal entered through a manual operation switch.

In the above embodiment, if the bar code is not normally read, the pressure plate 142 is automatically set to the 120-type position and the initial available exposure number is set to "32". However, it is possible to instruct the photographer to manually enter the setup values simultaneously with displaying the bar code reading error.

Although the film sensor 123a is designed to detect the adhesive tape 116c as a reference for detecting the position of the filmstrip 116b in the above embodiment, the film sensor 123a may be designed to detect the border between the light-shielding paper 116a and the filmstrip 116b. It is also possible to omit the film sensor 123b, and controls the film transport based on the output signal from the bar code sensor 123b.

The automatic pressure plate switching device of the present invention is applicable to a camera where the film slip is wound up by rotating a film winding wheel by hand. The present invention is applicable not only to the Brownie camera, but also to any of those types of cameras which use several types of photo film whose thickness and available exposure number are different according to the film type.

Thus, the present invention should not be limited to the above embodiments but, on the contrary, various modifications may be possible to those person skilled in the art without departing from the scope of claims attached hereto.

What is claimed is:

1. A camera for use with a roll film having a bar code thereon, the camera comprising:

a bar code reading device for reading the bar code of the roll film as presently loaded in the camera while a first frame recording area of a filmstrip of the presently loaded roll film is transported to an exposure position behind an exposure aperture;

a checking device for checking whether bar code data read by the bar code reading device is proper or improper;

a nonvolatile memory for storing bar code data, the bar code data of the nonvolatile memory being renewed each time proper bar code data is obtained through the bar code reading device;

a manual data entry device;

a mode selector switchable by a user to select one of at least a first, second, and third mode; and a setup device for setting operating characteristics of the camera;

wherein when the first mode is selected, the setup device allows the user to select between bar code data stored in the nonvolatile memory and data entered through the manual data entry device;

wherein when the second mode is selected, the setup device substitutes the bar code data stored in the nonvolatile memory for the read bar code data when the read bar code data is determined to be improper; and wherein when the third mode is selected, the setup device requires the user to enter data using the manual data entry device which is used to replace the improper read bar code data when the read bar code data is determined to be improper.

2. The camera of claim 1, further comprising:

a take-up spool structured and arranged to receive the roll film;

a gear train mechanically connected to both the take-up spool and a supply spool to which the roll film is attached;

a motor mechanically connected to both the take-up spool and the rewind shaft through the gear train; and a motor controller electrically connected to the motor;

wherein when the motor controller causes the motor to rotate in a first direction, the take-up spool is rotated in a film winding direction and the supply spool is released, and when the motor controller causes the motor to rotate in a second direction, the supply spool is rotated and the take-up spool is released.

3. The camera of claim 1, further comprising:

a display device for displaying film data represented by the bar code read from the bar code of the presently loaded roll film when the read bar code data is proper, or represented by bar code data stored in the nonvolatile memory along with an error indicia when the read bar code data is improper.

4. A camera according to claim 3, wherein the bar code is provided on an adhesive tape that secures the filmstrip to a light-shielding paper at a leading end of the filmstrip.

5. The camera of claim 2, wherein the camera is constructed so that if the checking device determines that the bar code read by the bar code reading device is invalid after a first reading by the bar code reading device, the motor controller causes the motor to rotate in the second direction to rewind the roll film, and then causes the motor to rotate in the first direction to cause the bar code to pass by the bar code reading device a second time before determining whether the bar code data is proper or improper.

6. The camera of claim 3, further comprising an alarm device capable of producing an audible alarm;

wherein when the error indicia is displayed on the device, the audible alarm is produced by the alarm device.

7. A camera according to claim 5, further comprising a display device for displaying film data represented by the bar code data stored in the nonvolatile memory along with an error indicia when the bar code data read from the presently loaded roll film is improper.

8. A method of setting up a camera by use of a bar code provided on a roll film, the method comprising the steps of:

rotating a motor in a first direction to cause a take-up spool to rotate so as to move the roll film in a film winding direction while a rewind shaft is allowed to rotate freely;

reading a bar code of a roll film presently loaded in the camera while a first frame recording area of a film-strip of the presently loaded roll film is transported by the take-up spool to an exposure position behind an exposure aperture;

checking if bar code data read from the bar code of the roll film is proper;

writing the bar code data in a nonvolatile memory when the bar code data is proper, the nonvolatile memory being renewed each time proper bar code data is obtained; and if the read bar code data is proper, setting up the camera in accordance with the bar code data read from the bar code of the presently loaded roll film;

if the read bar code data is improper, rotating the motor in a second direction to cause the rewind shaft to rotate so as to move the roll film in a rewinding direction while the take-up spool is allowed to rotate freely, then rotating the motor in the first direction to cause the take-up spool to rotate so as to move the roll film in the film winding direction while the rewind shaft is allowed to rotate freely, reading the bar code a second time;

if the bar code data is read the second time and is determined to be improper, setting up the camera in accordance with bar code data stored in the nonvolatile memory.

9. A method according to claim 8, further comprising the step of displaying film data represented by the bar code data stored in the nonvolatile memory along with an error indicia when the bar code data read from the presently loaded roll film is improper.

10. A method according to claim 8, wherein if the bar code data is read the second time and is determined to be improper and after the camera is set up in accordance with the bar code data stored in the nonvolatile memory, a further and subsequent step of manually entering film data and setting up the camera in accordance with the manually entered film data is performed.

11. A method of setting up a camera by use of a bar code provided on a roll film, the method comprising the steps of:

rotating a motor in a first direction to cause a take-up spool to rotate so as to move the roll film in a film winding direction while a rewind shaft is allowed to rotate freely;

reading a bar code of a roll film presently loaded in the camera while a first frame recording area of a film-strip of the presently loaded roll film is transported by the take-up spool to an exposure position behind an exposure aperture;

checking if bar code data read from the bar code of the roll film is proper;

writing the bar code data in a nonvolatile memory when the bar code data is proper, the nonvolatile memory being renewed each time proper bar code data is obtained; and if the read bar code data is proper, setting up the camera in accordance with the bar code data read from the bar code of the presently loaded roll film;

if the read bar code data is improper, rotating the motor in a second direction to cause the rewind shaft to rotate so as to move the roll film in a rewinding direction while the take-up spool is allowed to rotate freely, then rotating the motor in the first direction to cause the take-up spool to rotate so as to move the roll film in the film winding direction while the rewind shaft is allowed to rotate freely, reading the bar code a second time;

if the bar code data is read the second time and is determined to be improper and a mode selector is set to a first mode, allowing a user to choose between bar code stored in the nonvolatile memory and data entered through a manual data entry device;

if the bar code data is read the second time and is determined to be improper and a mode selector is set to a second mode, substituting the bar code data stored in the nonvolatile memory for the read bar code data; and if the bar code data is read the second time and is determined to be improper and a mode selector is set to a second mode, requiring the user to enter data using the manual data entry device which is used to replace the improper read bar code data.

\* \* \* \* \*